(12) United States Patent
Wagner et al.

(10) Patent No.: US 10,740,772 B2
(45) Date of Patent: Aug. 11, 2020

(54) SYSTEMS AND METHODS FOR FORECASTING BASED UPON TIME SERIES DATA

(71) Applicant: Prevedere, Inc, Columbus, OH (US)

(72) Inventors: Richard Wagner, Columbus, OH (US); Jason B. Kerns, Westerville, OH (US); Jose K. Paul, Columbus, OH (US); Alexander C. Elek, Westerville, OH (US)

(73) Assignee: Prevedere, Inc., Columbus, OH (US)

( * ) Notice: Subject to any disclaimer, the term of this patent is extended or adjusted under 35 U.S.C. 154(b) by 348 days.

(21) Appl. No.: 15/154,697

(22) Filed: May 13, 2016

(65) Prior Publication Data

US 2016/0328726 A1 Nov. 10, 2016

Related U.S. Application Data

(63) Continuation-in-part of application No. 13/558,333, filed on Jul. 25, 2012, now Pat. No. 10,176,533.

(Continued)

(51) Int. Cl.
*G06Q 30/02* (2012.01)
*G06F 16/25* (2019.01)
*G06F 16/2455* (2019.01)

(52) U.S. Cl.
CPC ... *G06Q 30/0202* (2013.01); *G06F 16/24553* (2019.01); *G06F 16/252* (2019.01)

(58) Field of Classification Search
CPC ......... G06Q 10/00; G06Q 40/00; G06F 17/60
(Continued)

(56) References Cited

U.S. PATENT DOCUMENTS 5,432,530 A 7/1995 Arita et al.
5,454,371 A 10/1995 Fenster et al.
(Continued)

FOREIGN PATENT DOCUMENTS

WO WO2015/183255 12/2015

OTHER PUBLICATIONS

USPTO, ISA/US, "Notification of Transmittal of the ISR and the Written Opinion of the International Searching Authority, or the Declaration," in PCT Application No. PCT/US2016/067026, dated Mar. 27, 2017, 7 pages.

(Continued)

*Primary Examiner* — Romain Jeanty
(74) *Attorney, Agent, or Firm* — Kang S. Lim

(57) ABSTRACT

The present invention relates to systems and methods for forecasting using time series datasets. A composite may be generated by receiving datasets, normalizing them, and receiving formula configurations in order to combine the datasets together. The transformation of a dataset may be restricted if the accuracy of the transformation would be decreased, and if no suitable alternate dataset is available. A forecast may be generated using selected forecast type, calculation type, cutoff period, pre-adjustment, post-adjustment, indicators, and selected weights and offsets for the indicators. The forecast analysis may be updated by locking the time domain for one or more of the indicators. Forecast results may be outputted to a spreadsheet or other system utilizing add-ins. Any composite or forecast generated may be stored within a model repository for later use as an indicator.

14 Claims, 28 Drawing Sheets

Related U.S. Application Data

(60) Provisional application No. 62/269,978, filed on Dec. 19, 2015, provisional application No. 62/290,441, filed on Feb. 2, 2016, provisional application No. 61/511,527, filed on Jul. 25, 2011, provisional application No. 61/512,405, filed on Jul. 28, 2011.

(58) Field of Classification Search
USPC .................................................. 705/7.29
See application file for complete search history.

(56) References Cited

U.S. PATENT DOCUMENTS

| | | | |
|---|---|---|---|
| 5,475,851 A | 12/1995 | Kodosky et al. | |
| 5,727,161 A | 3/1998 | Purcell, Jr. | |
| 5,793,375 A | 8/1998 | Tanaka | |
| 6,054,984 A | 4/2000 | Alexander | |
| 6,064,984 A | 5/2000 | Ferguson et al. | |
| 6,133,914 A | 10/2000 | Rogers et al. | |
| 6,163,773 A * | 12/2000 | Kishi | G06F 12/121 706/16 |
| 6,362,842 B1 | 3/2002 | Tahara et al. | |
| 6,473,084 B1 | 10/2002 | Phillips et al. | |
| 6,549,864 B1 | 4/2003 | Portyrailo | |
| 6,614,456 B1 | 9/2003 | Rzepkowski et al. | |
| 6,757,217 B2 | 6/2004 | Eastwood et al. | |
| 6,801,199 B1 | 10/2004 | Wallman | |
| 6,822,662 B1 | 11/2004 | Cook et al. | |
| 6,901,383 B1 | 5/2005 | Ricketts et al. | |
| 7,134,093 B2 | 11/2006 | Etgen et al. | |
| 7,348,979 B2 | 3/2008 | Tso | |
| 7,363,584 B1 | 4/2008 | Molesky | |
| 7,496,852 B2 | 2/2009 | Eichorn et al. | |
| 7,554,521 B1 | 6/2009 | Migos et al. | |
| 7,698,188 B2 | 4/2010 | Hollas et al. | |
| 7,800,613 B2 | 9/2010 | Hanrahan et al. | |
| 7,818,246 B2 | 10/2010 | Cushing et al. | |
| 7,904,376 B2 | 3/2011 | Shapiro et al. | |
| 7,941,742 B1 | 5/2011 | Hao et al. | |
| 7,991,672 B2 | 8/2011 | Crowder | |
| 7,999,809 B2 | 8/2011 | Beers et al. | |
| 8,051,000 B2 | 11/2011 | Kurczek et al. | |
| 8,306,847 B2 | 11/2012 | Sperry | |
| 8,315,938 B1 | 11/2012 | Forsythe | |
| 8,346,682 B2 | 1/2013 | Steed et al. | |
| 8,381,090 B2 | 2/2013 | Bruckner et al. | |
| 8,843,427 B1 * | 9/2014 | Lin | G06N 20/00 706/45 |
| 2003/0126054 A1 | 7/2003 | Purcell, Jr. | |
| 2003/0212618 A1 | 11/2003 | Keyes et al. | |
| 2004/0169638 A1 | 9/2004 | Kaplan | |
| 2005/0021485 A1 | 1/2005 | Nodelman et al. | |
| 2007/0088648 A1 | 4/2007 | Mather et al. | |
| 2007/0156565 A1 | 7/2007 | Singer et al. | |
| 2007/0244741 A1 * | 10/2007 | Blume | G06Q 30/02 705/7.31 |
| 2008/0086401 A1 | 4/2008 | Mather | |
| 2008/0133313 A1 | 6/2008 | Bateni et al. | |
| 2008/0147486 A1 | 6/2008 | Wu | |
| 2008/0195930 A1 | 8/2008 | Tolle | |
| 2009/0083120 A1 * | 3/2009 | Strichman | G06Q 10/00 705/7.35 |
| 2009/0187606 A1 | 7/2009 | Allweil et al. | |
| 2009/0216684 A1 | 8/2009 | Helweg | |
| 2010/0076819 A1 * | 3/2010 | Wannier | G06Q 30/02 705/7.33 |
| 2010/0138275 A1 | 6/2010 | Bateni et al. | |
| 2010/0185976 A1 | 7/2010 | Sadanandan | |
| 2011/0007097 A1 | 2/2011 | Williams | |
| 2011/0087985 A1 | 4/2011 | Buchanan et al. | |
| 2011/0107265 A1 | 5/2011 | Buchanan et al. | |
| 2011/0208701 A1 | 8/2011 | Jackson et al. | |
| 2011/0231339 A1 * | 9/2011 | Hansen | G06Q 10/087 705/36 R |
| 2011/0246260 A1 * | 10/2011 | Gilbert | G06Q 30/02 705/7.32 |
| 2011/0283188 A1 | 11/2011 | Farrenkopf et al. | |
| 2011/0302112 A1 | 12/2011 | Shan | |
| 2011/0313809 A1 * | 12/2011 | Baek | G06Q 10/06313 705/7.23 |
| 2012/0016269 A1 * | 1/2012 | Moctezuma de la Barrera | G06F 19/321 600/595 |
| 2012/0101912 A1 * | 4/2012 | Sen | G06Q 30/08 705/26.3 |
| 2012/0159384 A1 | 6/2012 | Zyskowski et al. | |
| 2012/0188250 A1 | 7/2012 | Kaplan et al. | |
| 2012/0245970 A1 | 9/2012 | Pulido De Los Reyes et al. | |
| 2012/0317506 A1 | 12/2012 | Zhao et al. | |
| 2012/0317509 A1 | 12/2012 | Ludwig et al. | |
| 2013/0024170 A1 | 1/2013 | Dannecker et al. | |
| 2013/0041792 A1 | 2/2013 | King et al. | |
| 2013/0055132 A1 | 2/2013 | Foslien | |
| 2013/0086521 A1 | 4/2013 | Grossele et al. | |
| 2013/0179130 A1 | 7/2013 | Zhandov | |
| 2013/0179739 A1 | 7/2013 | Ikegami | |
| 2014/0172654 A1 | 6/2014 | Wagner | |

OTHER PUBLICATIONS

SAS/ETS User's Guide Version 8—vol. 1 SAS, Institute Inc., 1999.
Tableau Software Combination Charts, Tableau Software, Inc., 2010.
Tableau Software Forecasting, Tableau Software, Inc., 2012.
Tableau Visual Guidebook, Tableau Software, Inc., 2010.
MacDonald, MRRHWQ, Excel 2003 for Starters—Chapter 9 Pogue Press, O'Reily, Feb. 9, 2009.
SAS/Graph 9.2 Reference—Second Edition, SAS, 2010.
Jelen, Bill, Rev Up to Excel 2010—Upgraders Guide to Excel 2010 Holy Marco! Books, 2010.
Moyle, Michael et al., A Flick in the Right Direction: A Case Stude of Gestural Input in Behavior and Information Technology, 2005.
Microsoft Excel 2010 Charts and Graphs—Class Workbook Ucsd Biomedical Library Workshop, Unknown Date.
Stolte, Chris et al., Polaris: A System for Query, Analysis, and Visualization of Multidimensional Relational Databases IEEE Transactions on Visualization and Computer Graphics, vol. 8, No. 1. Jan.-Mar. 2002.
Cognos 8 Business Intelligence—Report Studio User Guide, Cognos Inc., 2006.
Basic Usage of AS/ETS Software to Forecast a Time Series NESUG16, Statistics, Data Analysis & Econometrics, 2003.
Cyclical Analysis and Exponential Forecasting Simetar, Simulation & Econometrics to Analyze Risk, 2004.
Lahiri, Kajal, Evaluating Probability Forecasts for GDP Declines 2007.
European Patent Office, EPO Application No. 16876720.0, "Supplementary Extended European Search Report and Opinion", dated May 28, 2019, 7 pages.

* cited by examiner

830

News

- Predictive Analytics Forecasting Solution Prevedere Doubles Client Base And Staff in 2015
  01/06/2016

- Prevedere Releases Next Generation APIs, Enhancing Leadership in Predictive Analytics
  11/17/2015

- Prevedere Presents At Business Planning And Forecasting Best Practice Conference
  10/29/2015

- Prevedere Adds Two Predictive Analytics Veterans To Its Advisory Board
  09/30/2015

- Prevedere Partners With TekLink To Deliver Real-Time Forecasting Integration With SAP Business Planning And Consolidation
  09/16/2015

Fig. 8B

Adjusted R-Squared 0.081    Predictive R-Squared 0.000    Est. Of Standard Error 2.812

New Projects Inquiry
Value -0.231
Standard Error 0.119
T Value -1.160
95% Confidence Interval [-.6213, .1594]

Architectural Billings Index - Design Con...
Value 0.872
Standard Error 0.402
T Value 2.167
95% Confidence Interval [.0833, 1.6603]

Adjusted R-Squared 0.119    Predictive R-Squared 0.000    Est. Of Standard Error 2.753

Architectural Billings Index - Design Con...
Value 0.801
Standard Error 0.343

Dodge: Momentum Index
Value -0.159
Standard Error 0.071

Fig. 13B

SYSTEMS AND METHODS FOR FORECASTING BASED UPON TIME SERIES DATA

CROSS REFERENCE TO RELATED APPLICATIONS

The present application claims priority to a commonly-owned application entitled "Systems and Methods for Analyzing Time Series Data to Extract and Display Statistical Relationships Between Data Series", U.S. Provisional application No. 62/269,978, filed on Dec. 19, 2015, which is incorporated herein by reference for all purposes.

The present application also claims priority to a commonly-owned application entitled "Systems and Methods for Analyzing Time Series Data to Extract and Display Statistical Relationships Between Data Series", U.S. Provisional application No. 62/290,441, filed on Feb. 2, 2016, which is incorporated herein by reference for all purposes.

The present application additionally is a continuation-in-part and claims priority to a commonly-owned application entitled "Interactive Chart Utilizing Shifting Control to Render Shifting of Time Domains of Data Series", U.S. application Ser. No. 13/558,333, filed on Jul. 25, 2012, which claims priority to U.S. Provisional application 61/511,527, filed Jul. 25, 2011 and U.S. Provisional application 61/512,405, filed Jul. 28, 2011, which applications are incorporated herein by reference for all purposes.

BACKGROUND

The present invention relates to systems and methods for analyzing time series data to generate forecasts. These forecasts enable the analysis and display of statistical relationships between data series.

Many factors influence the success or failure of a business or other organization. Many of these factors include controllable variables, such as product development, talent acquisition and retention, and securing business deals. However, a significant amount of the variables influencing a business' success are external to the organization. These external factors that influence an organization are typically entirely out of control of the organization, and are often poorly understood or accounted for during business planning.

While these external factors are not necessarily able to be altered, being able to incorporate them into business planning allows a business to better understand the impact on the business, and make strategic decisions that take into account these external factors. This may result in improved business performance. However, it has traditionally been very difficult to properly account for or model these external factors; let alone generate meaningful forecasts using many different factors in a statistically meaningful and user friendly way.

For example, many current methods of statistical analysis are often manual and require segment specific user expertise, thereby substantially limiting their usefulness and utility. In addition, most organizational financial and reporting solutions generate reports and forecasts based mostly on internal historic organizational data, and ignore potentially important external factors.

As a result, current analytical methods are incomplete, time consuming and labor intensive processes that are inadequate for the today's competitive, complex and constantly evolving business landscape.

It is therefore apparent that an urgent need exists for organizational solutions that enable the forecasting using time series data sets. These improved data analytics substantially reduces the time and effort required to compute and display more accurate results to organizations.

SUMMARY

To achieve the foregoing and in accordance with the present invention, systems and methods for forecasting using time series data are provided. Such systems and methods enable more efficient generation of relevant and usable forecast models and enhanced business analytics.

In some embodiments, a composite may be generated by receiving datasets, normalizing them, and receiving formula configurations in order to combine the datasets together. As new data becomes available the composites are automatically updated. The datasets utilized may be any internal or external data source, including demographics data, meteorological data, climatic data, weather conditions, environmental data, industrial data and international financial market conditions. Normalizing the datasets includes shifting a time domain for the datasets such that all of the normalized datasets have a common time domain, converting the selected datasets into a percentage value, converting the selected datasets into a dollar value, or converting the selected datasets into a dollar versus time value.

In some embodiments, the transformation of a dataset may be restricted if the accuracy of the transformation would be decreased, and if no suitable alternate dataset is available. These transformations might include aggregation of the dataset for use in a forecast. Aggregation may include a roll up of a rate of change. Accuracy is measured as an impact upon the forecast. Upon rejection the user may be notified, and if available, an alternate dataset may be suggested for use.

In some embodiments, a forecast may be generated. For the forecast the user logs into an account and selects a forecast type, a calculation type, a cutoff period, a pre-adjustment and a post adjustment. Likewise the user may search for desired indicators and select ones that are to be utilized. Indicators presented to the user may be limited due to the user's account access controls. The user may then set weights and time offsets for each of the selected indicators.

The forecaster may then generate an $R^2$ value, a procyclic value and a countercyclic value for each of the indicators given the weight factor and time offset received. This allows the user to adjust these values until the statistical measures for the indicator match the user's desires. Then the forecast may be generated using the selection of indicators and corresponding weight factor and time offset, the forecast type, the calculation type, the cutoff period, the pre-adjustment and the post adjustment. Forecasts may be updated as updates to the underlying data become available.

In some cases the forecast may be generated by applying a transformation to the selection of indicators, calculating a percent change based upon date for each selection of indicators, arranging the percent change over a set period defined by the cutoff period, and multiplying the arranged percent change by previous years' value. The transformation may include normalizing each of the indicators, applying the time offset corresponding to each of the indicators, and multiplying the indicators by their corresponding weight factor.

In some embodiments, the forecast analysis may be updated by locking the time domain for one or more of the indicators. The time domain for the other indicators may be altered, and new statistical measures may be generated accordingly. Forecast results may be outputted to a spreadsheet or other system utilizing add-ins.

Any composite or forecast generated may be stored within a model repository for later use as an indicator. This allows for 'nested' forecasts. Any update to the underlying data percolates up through the nested composites and forecasts ensuring that no forecast becomes stale.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1A:
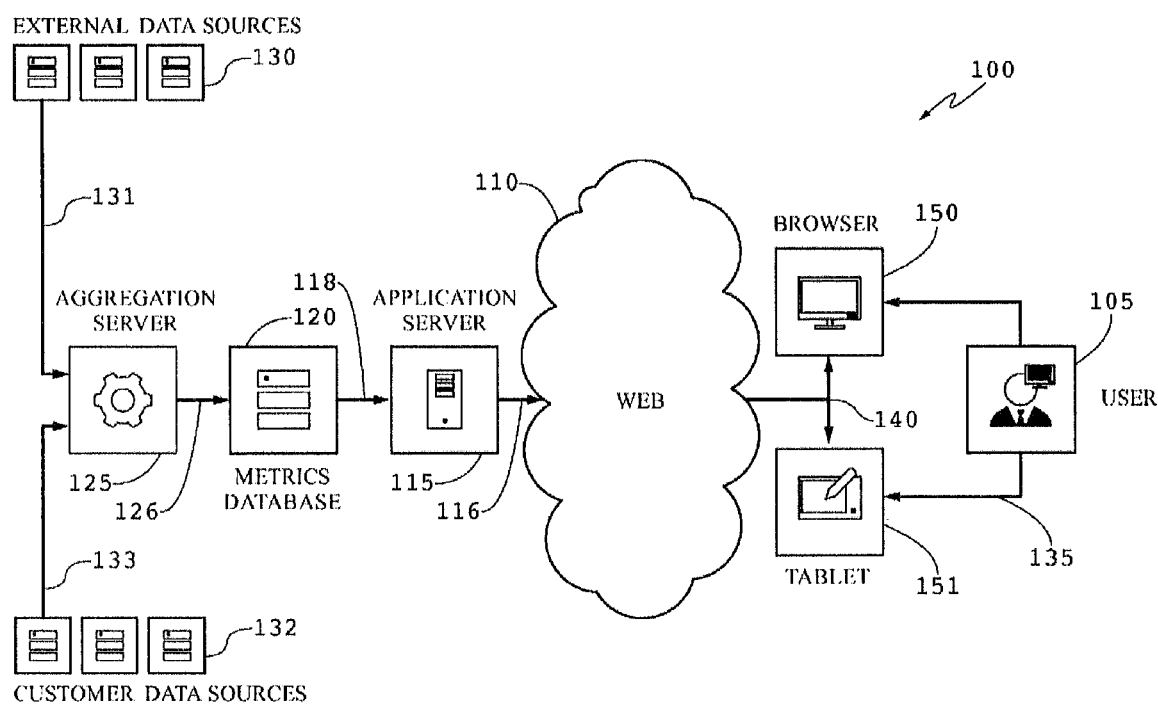
FIG. 1A is an example logical diagram of a data management and forecasting system, in accordance with some embodiments.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "only," "first," "initially," "next," "subsequently," "before," "after," "lastly," and "finally," are not meant to limit the scope of the present invention as the embodiments disclosed herein are merely exemplary.

Note that significant portions of this disclosure will focus on the generation of economic forecasts for businesses. While this is intended as a common use case, it should be understood that the presently disclosed systems and methods are useful for the generation of any forecast based upon any time series data sets, for consumption by any kind of user. For example, the presently disclosed systems and methods could be relied upon by a researcher to predict construction trends as easily as it is used by a business to forecast sales trends. As such, any time the term 'business' is used in the context of this disclosure it should be understood that this may extend to any organization type: individual, business entity, governmental group, non-profit, religious affiliation, research institution, and the like. Further, references to an economic forecast should be understood to not be limited to commerce, but rather to any situation where a forecast may be needed or desired.

Lastly, note that the following description will be provided in a series of subsections for clarification purposes. These following subsections are not intended to artificially limit the scope of the disclosure, and as such any portion of one section should be understood to apply, if desired, to another section.

I. DATA MANAGEMENT AND FORECASTING SYSTEMS

The present invention relates to systems and methods for using time series data to generate composites, forecasts, and to analyze said forecasts to derive insights. Such systems and methods allow for superior forecasting ability, efficient model development, and enhanced analysis tools. Ultimately, any analyst may utilize embodiments of the disclosed systems and methods to generate more effective recommendations, or alter behaviors.

To facilitate discussion, FIG. 1A is an example logical diagram of a data management and forecasting system 100. The data analysis system 100 connects a given analyst user 105 through a network 110 to the system application server 115. An database 120 (or other suitable dataset based upon forecast sought) is linked to the system application server via connection 121 and the database 120 thus provides access to the data necessary for utilization by the application server 115.

The database 120 is populated with data delivered by and through the data aggregation server 125 via connection 126. Data aggregation server 125 is configured to have access to a number of data sources, for instance external data sources 130 through connection 131. The data aggregation server can also be configured to have access to proprietary or internal data sources, i.e. customer data sources, 132, through connection 133. The aggregated data may be stored in a relational database (RDBM) or in big data-related storage facilities (e.g., Hadoop, NoSQL), with its formatting pre-processed to some degree (if desired) to conform to the data format requirement of the analysis component.

Network 110 provides access to the user or data analyst (the user analyst). User analyst 105 will typically access the system through an internet browser, such as Mozilla Firefox, or a standalone application, such as an app on tablet 151. As such the user analyst (as shown by arrow 135) may use an internet connected device such as browser terminal 150, whether a personal computer, mainframe computer, or VT100 emulating terminal. Alternatively, mobile devices such as a tablet computer 151, smart telephone, or wirelessly connected laptop, whether operated over the internet or other digital telecommunications networks, such as a 3G network. In any implementation, a data connection 140 is established between the terminal (i.e. 150 or 151) through network 110 to the application server 115 through connection 116.

Network 110 is depicted as a network cloud and as such is representative of a wide variety of telecommunications networks, for instance the world wide web, the internet, secure data networks, such as those provided by financial institutions or government entities such as the Department of Treasury or Department of Commerce, internal networks such as local Ethernet networks or intranets, direct connections by fiber optic networks, analog telephone networks, through satellite transmission, or through any combination thereof.

The database 120 serves as an online available database repository for collected data including such data as internal metrics. Internal metrics can be comprised of, for instance, company financial data of a company or other entity, or data derived from proprietary subscription sources. Economic, demographic, and statistical data that are collected from various sources and stored in a relational database, may reside in a local hardware set or within a company intranet, or may be hosted and maintained by a third-party and made accessible via the internet.

The application server 115 provides access to a system that provides a set of calculations based on system formula used to calculate the leading, lagging, coincident, procyclic, acyclic, and counter-cyclic nature of economic, demographic, or statistical data compared to internal metrics, e.g., company financial results, or other external metrics. The system also provides for formula that may be used to calculate forecast results based on projected or actual economic, demographic, and statistical data and company financial or sold volume or quantity data. These calculations can be displayed by the system in chart or other graphical format. A chart may be displayed showing the various relationships between leading, lagging, coincident, procyclic, acyclic, or counter-cyclic company data when compared to macroeconomic, demographic, or statistical data, for instance. Another set of charting systems is configurable to display forecasted results of company financial, or sold volume or quantity data and economic, demographic, or statistical data as a highlighted plot on a software-based chart that compares the raw or formatted indicator data to a selected indicator.

For the purposes of this disclosure, the change observed in a metric is also classified according to its direction of change relative to the indicator that it is being measured against. When the metric changes in the same direction as the indicator, the relationship is said to be 'procyclic'. When the change is in the opposite direction as the indicator, the relationship is said to be 'countercyclic'. Because it is rare that any two metrics will be fully procyclic or countercyclic, it is also possible that a metric and an indicator can be acyclic—i.e., the metric exhibits both procyclic and countercyclic movement with respect to the indicator.

The application residing on server 115 is provided access to interact with the customer datasource(s) 132 through the database 120 to perform automatic calculations which identify leading, lagging, and coincident indicators as well as the procyclic, acyclic, and counter-cyclic relationships between customer data and the available economic, demographic, and statistical data. Users 105 of the software applications that can be made available on the application server 115 are able to select and view charts or monitor dashboard modules displaying the results of the calculations performed by the system. The user 105 can select data in the customer repository for use in the calculations that may allow the user to forecast future performance. The types of indicators and internal data are discussed in more detail in connection with the discourse accompanying the following figures. Alternatively, users can view external economic, demographic, and statistical data only and do not have to interface with internal results, at the option of the user.

Data is collected for external indicators and internal metrics of a company through the data aggregation server 125. The formulas built into the application assist the users 105 to identify relationships between the data. Users 105 can then use the charting components to view the results of the calculations and forecasts. In some embodiments, the data can be entered into the database 120 manually, as opposed to utilizing the data aggregation server 125 and interface for calculation and forecasting. Users 105 can enter and view any type of data and use the applications to view charts and graphs of the data.

Figure 1B:
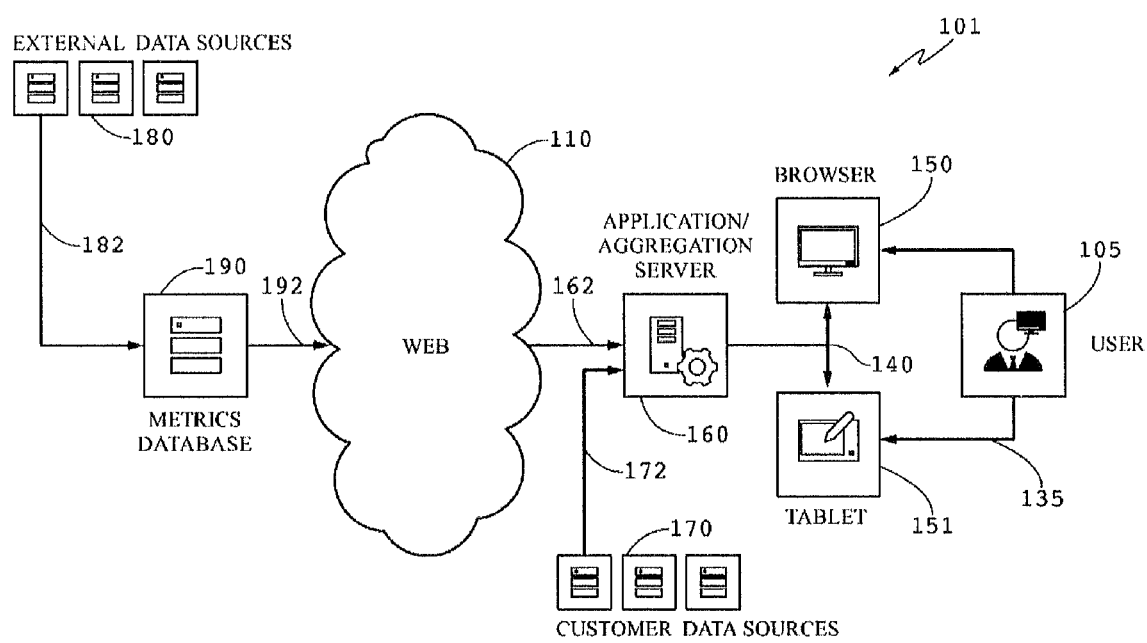
FIG. 1B is a second example logical diagram of a data management and forecasting system, in accordance with some embodiments.

Alternatively, in some system users may have sensitive data that requires it to be maintained within the corporate environment. FIG. 1B depicts components of the system in an exemplary configuration to achieve enhanced data security and internal accessibility while maintaining the usefulness of the system and methods disclosed herein. For example, the data management and analysis system 101 may be configured in such a manner so that the application and aggregation server functions described in connection with FIG. 1A are provided by one or more internal application/aggregation servers 160. The internal server 160 access external data sources 180 through metrics database 190, which may have its own aggregation implementation as well. The internal server aggregates the metrics database 190 through the web or other such network 110 via connections 162 and 192. The metrics database 190 acquires the appropriate data sets from one or more external sources, as at 180, through connection 182.

The one or more customer data sources 170 may be continue to be housed internally and securely within the internal network. The internal server 160 accesses the various internal sources 170 via connection 172, and implements the same type of aggregation techniques described above. The user 105 of the system then accesses the application server 160 with a tablet 151 or other browser software 150 via connections 135 and 140, as in FIG. 1A. External data sources 130 and 180 may be commercial data subscriptions, public data sources, or data entered into an accessible form manually.

Figure 2:
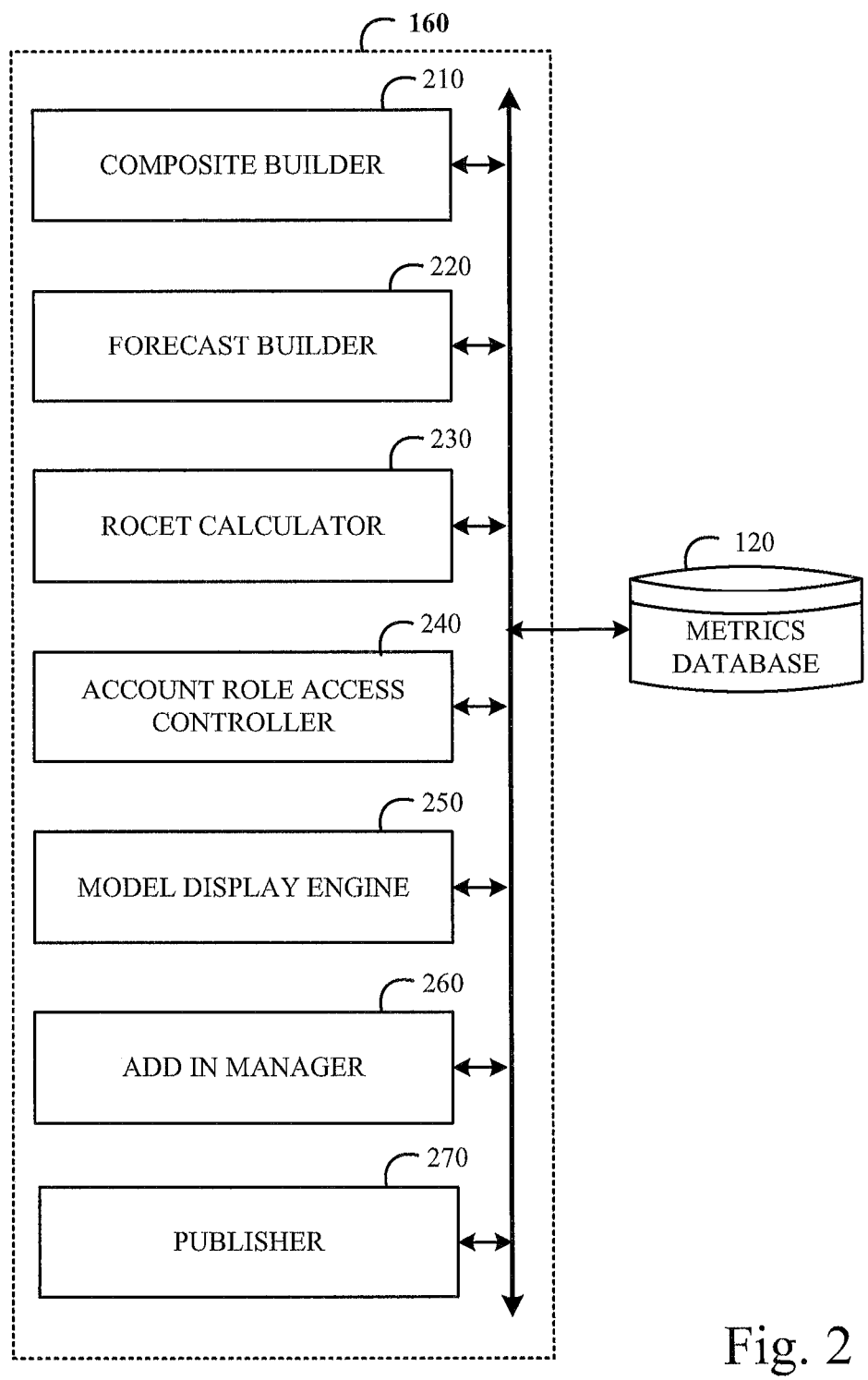
FIG. 2 is an example logical diagram of an application server, in accordance with some embodiments.

FIG. 2 is an example logical diagram of an application server 160 that includes various subcomponents that act in concert to enable the analysis of the aggregated data. Generally the data being leveraged for forecasting and analysis includes economic, demographic, geopolitical, public record and statistical data. In some embodiments, the system utilizes any time series dataset. This time series data stored in the metrics database 120, is available to all subsystems of the application server 160 for manipulation, transformation, aggregation, and analysis.

The subcomponents of the application server 160 are illustrated as unique modules within the server coupled by a common bus. While this embodiment is useful for clarification purposes, it should be understood that the presently discussed application server may consist of logical subcomponents operating within a single or distributed computing architecture, may include individual and dedicated hardware for each of the enumerated subcomponents, may include hard coded firmware devices within a server architecture, or any permutation of the embodiments described above. Further, it should be understood that the listed subcomponents are not an exhaustive listing of the functionality of the application server 160, and as such more or fewer than the listed subcomponents could exist in any given embodiment of the application server when deployed.

The application server 160 includes a composite builder 210 that is capable of combining various metrics from the metric database 120 (also referred to as factors or indicators), and manipulate them in order to generate composite indexes. These composites enable are entirely new datasets generated by transforming one or more existing datasets. The composite builder 210 also has the ability to assign access controls to the composites (to ensure organizational security and protection of intellectual property), and automatically update the composites as updated underlying data becomes available. In addition to providing useful tools user-friendly interfaces for searching, compiling and transforming the indicators, the composite builder 210 may provide suggestions to a user for inclusion of particular indicator data and possible manipulations based upon data type and statistical measures.

The application server 160 also includes a forecast builder 220 which is the heart of the analytics tools available to the user. The forecast builder's 220 functionality shall be discussed in considerable details below; however, at its root it allows for the advanced compilation of many indicators (including other published composite metrics and forecasts) and enables unique manipulation of these datasets in order to generate forecasts from any time series datasets. Some of the manipulations enabled by the forecast builder are the ability to visualize, on the fly, the $R^2$, procyclic and countercyclic values for each indicator compared to the forecast, and further allows for the locking of any indicators time domain, and to shift other indicators and automatically update statistical measures. Additionally, the forecast builder 220 may provide the user suggestions of suitable indicators, and manipulations to indicators to ensure a 'best' fit between prior actuals and the forecast over the same time period. The 'best' fit may include a localized maxima optimization of weighted statistical measures. For example, the $R^2$, procyclic and countercyclic values could each be assigned a multiplier and the time domain offset used for any given indicator could be optimized for accordingly. The multipliers/weights could, in some embodiments, be user defined.

Continuing, the application server 160 also includes a Rate of Change of Economic Trends (ROCET) calculator 230. This calculator is capable of generating trend information, including determining the speed of which the trend is changing. This may be accomplished by generating an equation that matches the trend line (via figure of merit or other method) and taking the derivative to determine the rate of change of the trend.

The application server 160 also includes an access controller 240 to protect various data from improper access. Even within an organization, it may be desirable for various employees or agents to have split access to various sensitive data sources, forecasts or models. Further, within a service or consulting organization, it is very important to separate various client's data, and role access control enables this data from being improperly comingled.

A model display engine 250 enables the graphical presentation of the models and forecasts. This module provides interfaces that allow for efficient and easy manipulation of data in a graphical format. In subsequent sections examples of screenshots of these interfaces will be provided for greater clarification.

An add-in manager 260 provides add-in application interfaces (APIs), emails, XLS and/or via subscriptions in order to export data for various external systems. For example the system may include Microsoft Excel®, SAP® and similar extensions for outputting raw data sets, forecast calculations and models.

Lastly, a publisher 270 allows for the composites generated by the composite builder 210, and forecasts generated via the forecast builder 220 to be published, with appropriate access controls, into a model library. This library may be stored in the metrics database 120 for search and utilization in order composite and forecast builds. Such a publishing capacity enables subsequent forecasts to have nested composite or forecasts incorporated into the calculation. Nesting forecasts enables more modular forecast builds. Any composite or forecast that has been published in the model library is updated as the underlying data sources are updated.

By automating an otherwise time-consuming and labor-intensive process, the above-described data management and forecasting systems offer many advantages. The application server reduces the time and effort in statistics analysis of data. In addition, the application server no longer requires user expertise. The result is substantially reduced user effort needed for the generation of timely and accurate predictive forecasts. Now that the systems for data management and forecast generation have been described in considerable detail, attention will be turned towards methods of system operation in the following subsection.

II. DATA MANAGEMENT AND FORECASTING METHODS

Figure 3:
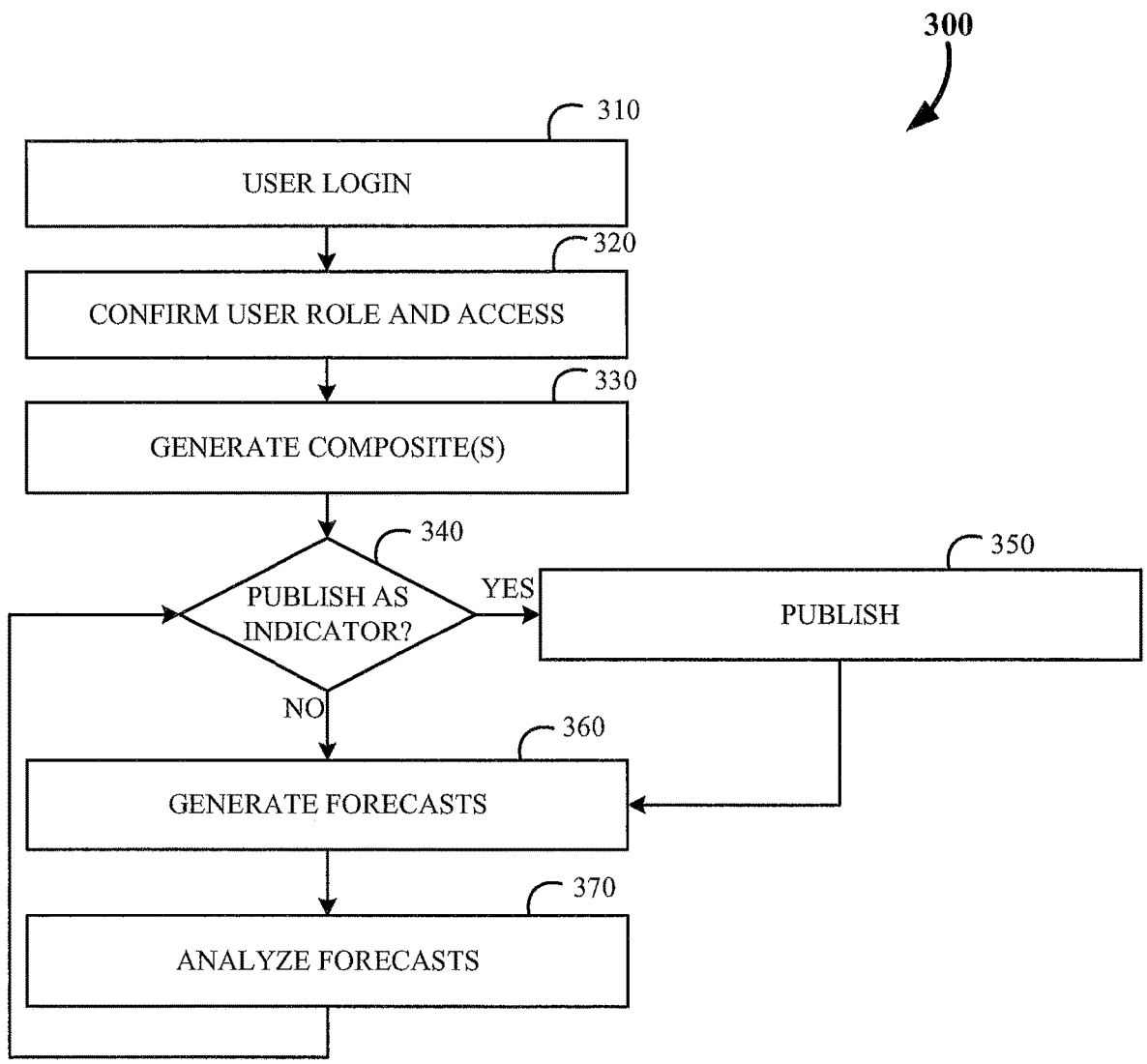
FIG. 3 is a flow chart diagram of an example high level process for forecasting utilizing time series datasets, in accordance with some embodiments.

To facilitate the discussion, FIG. 3 is a flow chart diagram of an example high level process 300 for forecasting utilizing time series datasets. In this example process, the user of the system initially logs in (at 310) using a user name and password combination, biometric identifier, physical or software key, or other suitable method for accessing the system with a defined user account. The user account enables proper access control to datasets to ensure that data is protected within an organization and between organizations.

Figure 4:
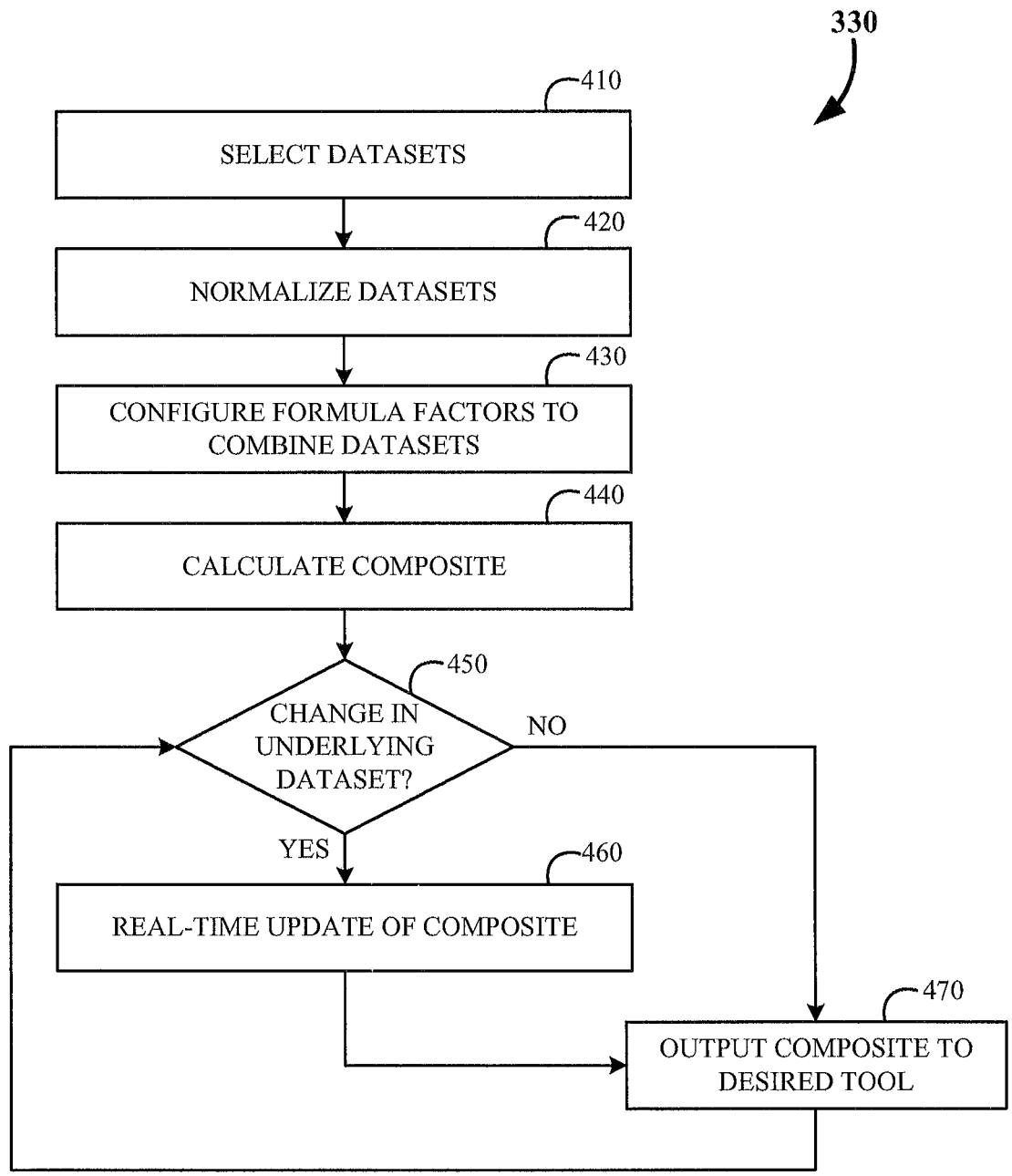
FIG. 4 is a flow chart diagram of an example high level process for the generation of composites, in accordance with some embodiments.

The user role access is confirmed (at 320) and the user is able to search and manipulate appropriate datasets. This allows the user to generate composites (at 330) for enhanced analysis. As previously discussed, a composite is an entirely new dataset generated via the compilation, transformation and aggregation of existing indicator data sets. FIG. 4 provides a more detailed example high level process for the generation of composites.

For composite generation, the user initially selects a dataset to be utilized (at 410). This selection may employ the user searching for a specific dataset using a keyword search. The datasets matching the keyword may be presented to the user for selection. In some embodiments, the search results may be ordered by best match to the keyword. In other embodiments, the search results may be ordered by alternate metrics, such as popularity of a given indicator (used in many other forecast models), accuracy of indicator data, frequency of indicator data being updated, or 'fit' between the indicator and the composite. Search results may further be sorted and filtered by certain characteristics of the data series, for instance, by region, industry, category, attribute, or the like. In some cases, search display may depend upon a weighted algorithm of any combination of the above factors.

A 'fit' between the composite and the indicator may be measured by the $R^2$, procyclic and/or countercyclic value when comparing the indicator to the composite. For example, if the composite is for domestic construction spend futures, indicators with a high degree of 'fit' may include stock prices for home improvement companies, number of building permit starts reported by the government, and raw material costs for concrete, lumber and steel, for example.

In addition to utilizing all or some of the above factors for displaying search results, some embodiments of the method may generate suggestions for indicators to the user independent of the search feature. Likewise, when a user selects an indicator, the system may be able to provide alternate recommendations of 'better' indicators based on any of the above factors.

Regardless of if an indicator is selected via a suggestion or a search, the next step is to normalize the datasets (at 420). This may include transforming all the datasets into a percent change over a given time period, an absolute dollar amount over a defined time period, or the like. Likewise, periods of time may also be normalized, such that the analysis window for all factors is equal. Next the user is able to configure a formula that takes each indicator and allows them to be combined (at 430). In some embodiments, this formula is freeform, allowing the user to tailor the formula however desired. In alternate embodiments, the formula configuration includes a set of discrete transformations, including providing each indicator with a weight, and allowing the indicators to be added/subtracted and/or multiplied or divided against any other single or group of indicators.

Once the formula has been configured, the system calculates the composite (at 440) and waits for a change in the underlying datasets (at 450). At any time the composite may be output for usage by another tool, such as a forecast (at 470), but upon a change to one of the indicators that comprises the composite, the method may cause a real-time update of the composite calculation (at 460). Any downstream tool the composite has been incorporated into will likewise receive an update.

Returning to FIG. 3, once composites have been generated, the method determines if it is desirable to publish the composite as an indicator (at 340) within the model library (as previously discussed). If so, then the composite is published (at 350) with appropriate access controls. Any access controls applied to the underlying datasets are automatically applied to the composite, in some embodiments, and further access controls may be enforced by the composite author as well.

Figure 5A:
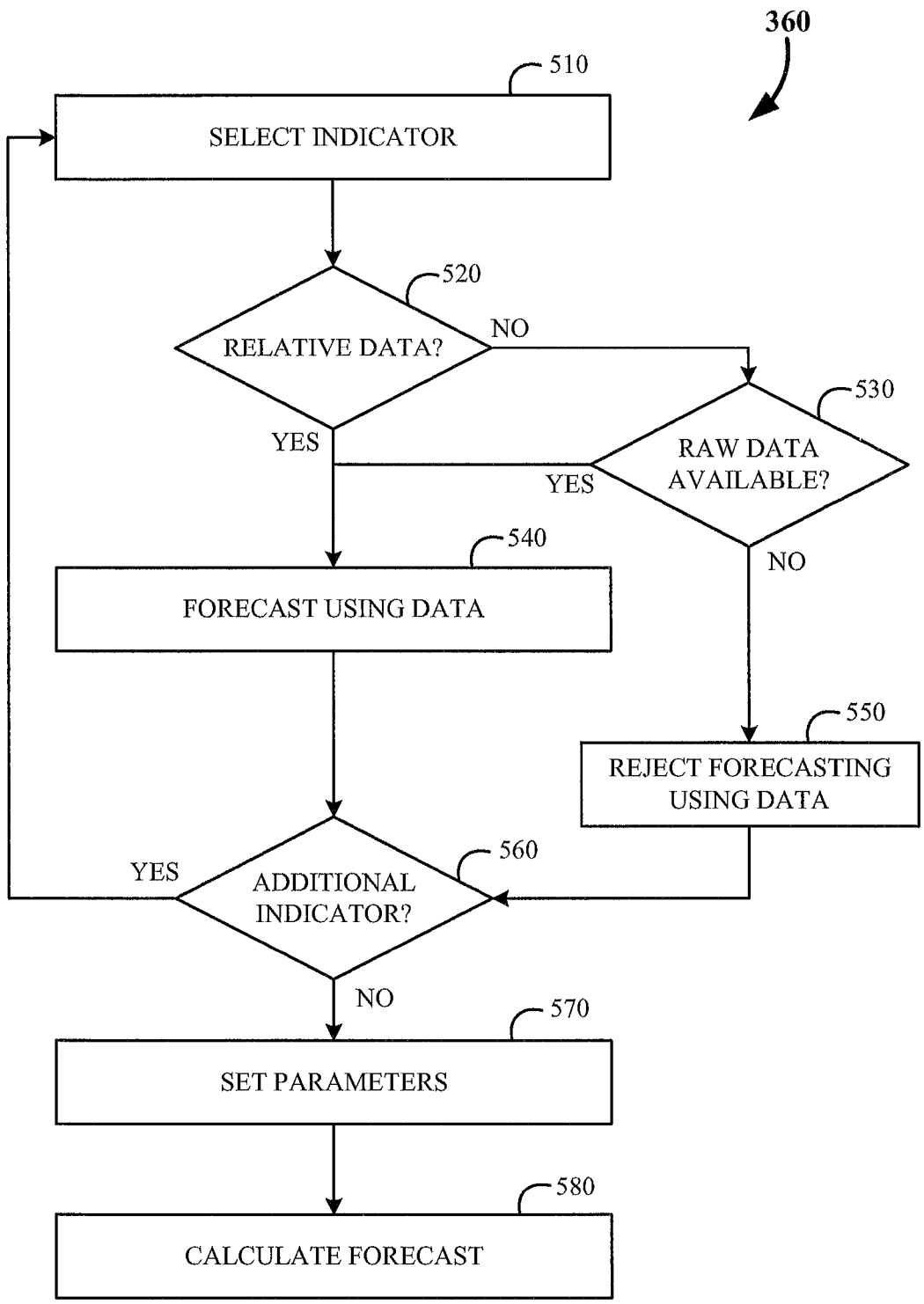
FIG. 5A-C are flow chart diagrams of an example processes for the generation of the forecasts, in accordance with some embodiments.
Figure 5B:
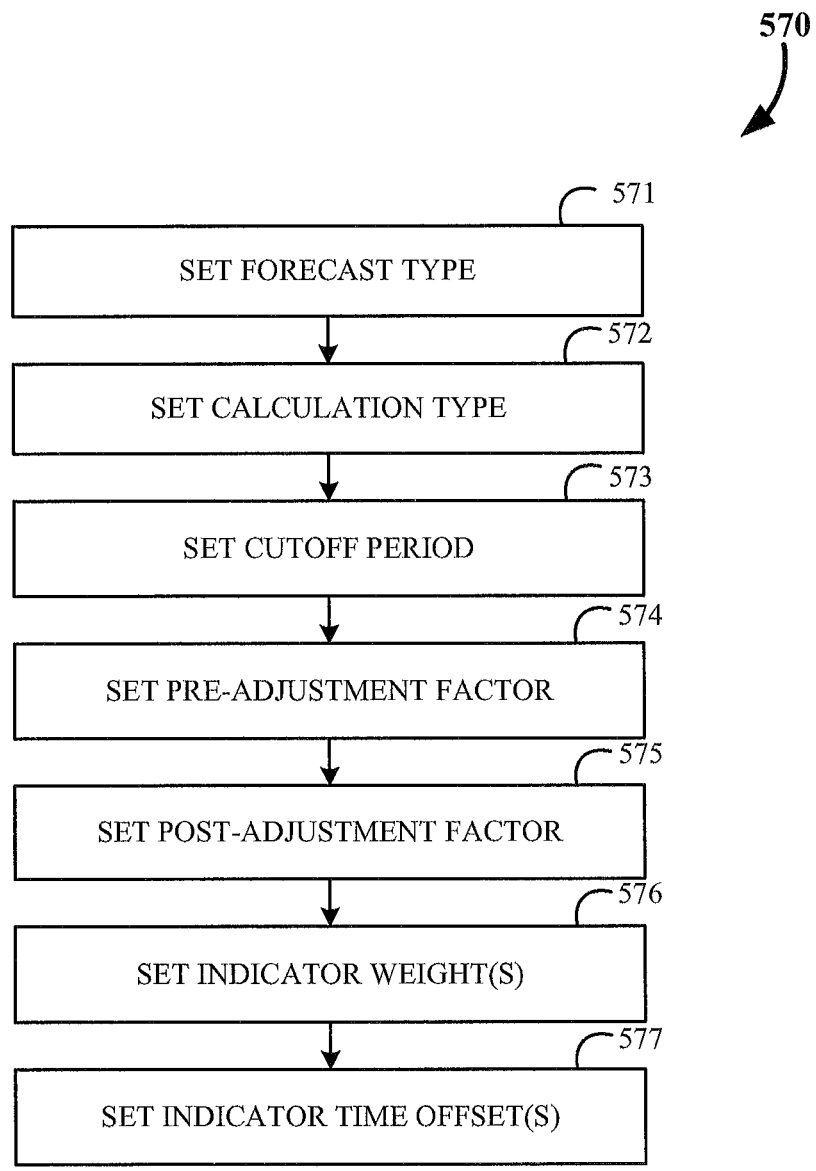
Figure 5C:
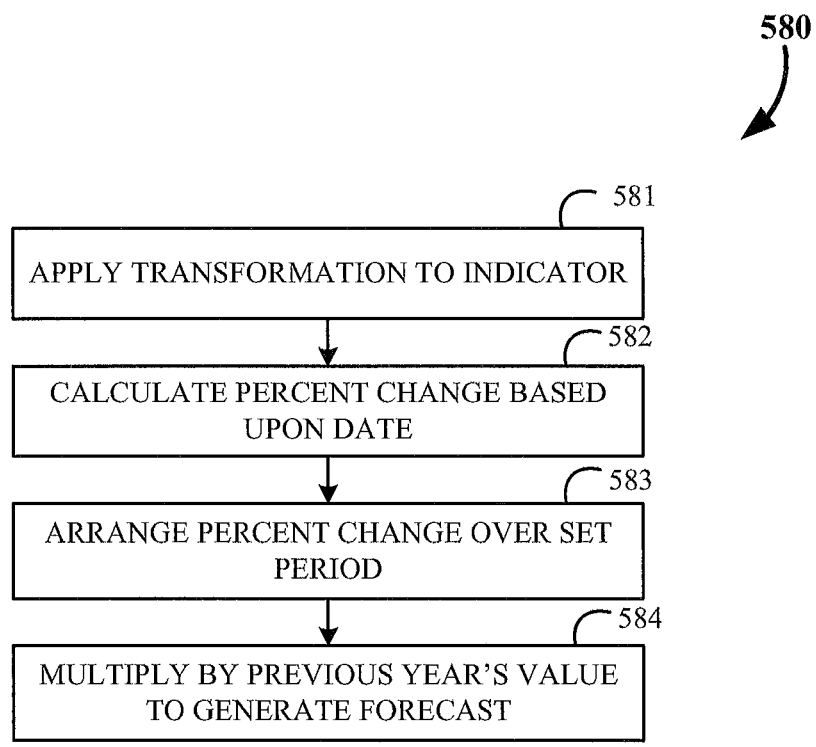

Next, a forecast may be generated (at 360), which is described in considerably more detail in reference to FIGS. 5A-5C. At FIG. 5A, the forecast generation process 360 initially begins with the selection of an indicator (at 510). This selection process may include searches or suggestions of indicators in much the same manner as described above in relation to the building of a composite. Again, the suggestion of an indicator (or display or search results, depending upon embodiment), may be driven by popularity of a given indicator, accuracy of indicator data, frequency of indicator data being updated, or 'fit' between the indicator and the forecast.

After the indicator has been selected, the system performs a check on whether the selected indicator is relative to the forecast (at 520). This step enables data that loses granularity, or becomes less accurate, upon transformation for the forecast, to be identified and either replaced or weeded out. For example, in some cases a set of revenue data may be needed to be converted into a year-over-year indicator. This aggregation may cause an artificial suppression of the indicator's value, and thus negatively impact the forecast. Such data is deemed not relative, and the method looks for whether raw data is available for the metric being sought (at 530). For example, maybe there is a metric for such year-over-year measure, or other revenue data of sufficient frequency that the system could generate such data without a loss of accuracy. If so, or if the original indicator selected is relative, then the method may forecast using the appropriate data (at 540). Otherwise, the method may outright reject the indicator as being included in the forecast (at 550). This may include an error message provided to the user explaining why the dataset is improper for the forecast.

This entire process may be repeated for additional indicators if they are present (at 560). This allows for forecasts that include as many indicators as a user desires. Once all indicators are selected, however, the method continues with the selection of parameters for the forecast (at 570). FIG. 5B provides more details regarding this example process 570 for selection of forecast parameters. Initially the forecast type is selected by the user (at 571). Forecast type may include segmented multivariate forecast, linear regression models, piecewise linear models, or the like. Additionally, the calculation type may be selected (at 572). Calculation types include year-over-year percent changes, month-over-month, three month moving averages, actual values, and the like.

Next the user selects the cutoff period for the forecast (at 573). Typically this is a time period in the future that provides the user with useful insight into business decisions, or other actions, that are to be taken in the near future. Many forecasts perform very well for some limited period of time, but then rapidly degrade. These forecast models, when viewed in the aggregate, are seen as very poor predictors. However, when subject to a cutoff period, these models may in fact be extremely high performing over the time period of concern. For this reason, the cutoff period is initially set in order to select the best forecast parameters and indicators over the period of interest.

Next pre-adjustment factors and post-adjustment factors are set (at 574 and 575 respectively). These factors are multipliers to the forecast and/or indicators that account for some anomaly in the data. For example, a major snowstorm impacting the eastern seaboard may have an exaggerated impact upon heating costs in the region. If the forecast is for global demand for heating oil, this unusual event may skew the final forecast. An adjustment factor may be leveraged in order to correct for such events.

Next, for each indicator, a weight and a time offset is provided (at 576 and 577 respectively). The weight may be any positive or negative number, and is a multiplier against the indicator to vary the influence of the indicator in the final model. A negative weight will reverse procyclic and countercyclic indicators. Determining whether an indicator relationship exists between two data series, as well as the nature and characteristics of such a relationship, if found, can be a very valuable tool. Armed with the knowledge, for example, that certain macroeconomic metrics are predictors of future internal metrics, business leaders can adjust internal processes and goals to increase productivity, profitability, and predictability. The time offset allows the user to move the time domain of any indicator relevant to the forecast. For example, in the above example of global heating oil, the global temperature may have a thirty day lag in reflecting in heating oil prices. In contrast, refining capacity versus crude supply may be a leading indicator of the heating oil prices. These two example indicators would be given different time offsets in order to refine the forecast.

For any forecast indicator, an $R^2$ value, procyclic value and countercyclic value is generated in real time for any given weight and time offset. These statistical measures enable the user to tailor their model according to their concerns. In some embodiments the weights and offsets for the indicators may be auto-populated by the method with suggested values. These values, as previously touched upon, may employ an optimization algorithm of weighted statistical measures. In some embodiment, the $R^2$ value, procyclic value and countercyclic values may be weighted and combined, and maximum value generated by a specific weight and offset can be suggested.

Returning to FIG. 5A, after the parameters have been set, the forecast is actually calculated (at 580). FIG. 5C details this example process 580 for calculating the forecast. Initially the indicators are transformed (at 581) according to the previously defined parameters. For example the indicator may be transformed into a common format such as year-over-year percent change. Next the percent change is determined for each date based upon the transformed indicators (at 582), and the percent change is arranged over the set period (at 583) defined by the cutoff period. Lastly, the previous year's value is multiplied by this percent change for each given date to generate the forward forecast (at 584). Forward forecasted indicators may then be weighted and offset according to the defined parameters. The forecasted indicators may also be summed and have the pre and post adjustments applied in order to generate the final forecast value.

Returning to FIG. 3, after the forecast has been generated, the forecast is subsequently analyzed (at 370). The process continues by determining if the forecast is to be published as an indicator. As previously mentioned, the published indicators may be access controlled for particular users, and may be incorporated into further forecasts.

Figure 6:
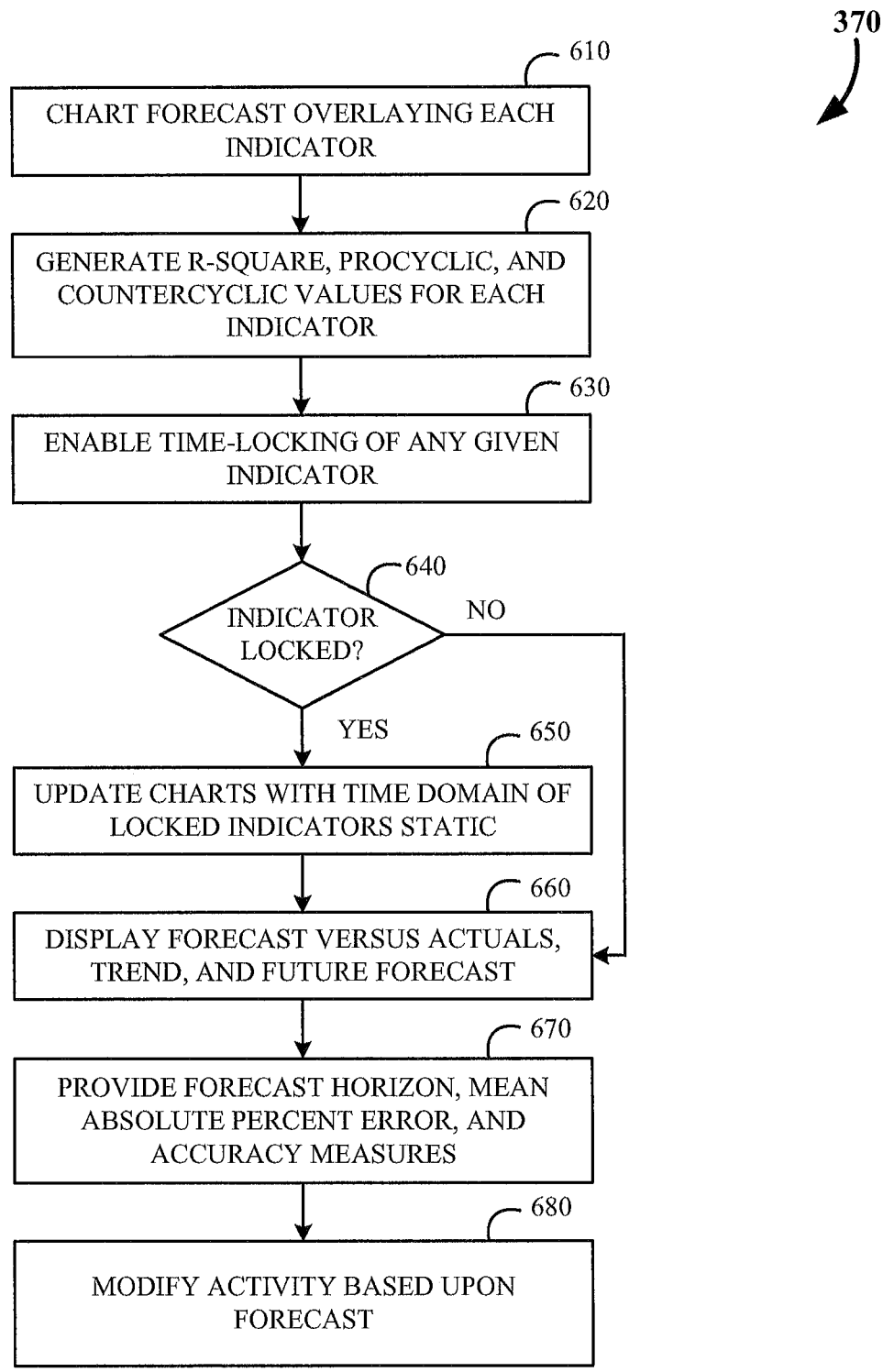
FIG. 6 is a flow chart diagram of an example process for the analysis of the forecasts, in accordance with some embodiments.

FIG. 6 provides further details regarding the example process 370 for the analysis of the forecasts. For the analysis, initially the forecast is charted overlying each indicator value (at 610). This charting allows a user to rapidly ascertain, using visual cues, the relationship between the forecast and each given metric. Humans are very visual, and being able to graphically identify trends is often much easier than using numerical data sets. In addition to the graphs, the R2, procyclic values, and countercyclic values may be presented (at 620) alongside the charted indicators.

Where the current method is particularly potent is its ability to rapidly shift the time domains, on the fly, of any of the indicators to determine the impact this has on the forecast. In some embodiments, one or more time domain outer bound drag bars may be utilized to alter the time domain of indicators. The time domain defining drag bar may be graphically manipulated by the user. Moving the drag bar will alter and redefine the time domain in which the selected metrics for a report are displayed. For example, in one situation a set of charts could display five metrics for the time period starting January 2006 and ending May 2012. By manipulating the drag bar, the time domain and thus the range of available data viewed in the report dashboard can be altered. In this example, the metrics are now displayed for the time period starting in March 2005 and ending in May 2012. Note that the entire time domain defining control may be graphically manipulated along a line, in some embodiments, where a lower and upper bound of the time domain are able to be manipulated, or the entire range may be merely shifted, thereby maintaining the same range, or length, of data represented.

Unique to the currently disclosed methods, however, is the ability to lock the time domain of any given indicator (at 630) such that if an indicator is locked (at 640) any changes to the time domain will only shift for non-locked indicators. Upon an shift in the time domain, the charts that are locked are kept static (at 650) as the other graphs are updated.

In addition to presenting the graphs comparing indicators to the forecast, in some embodiments, the forecast may be displayed versus actual values (for the past time period), trends for the forecast are likewise displayed, as well as the future forecast values (at 660). Forecast horizon, mean absolute percent error, and additional statistical accuracy measures for the forecast may also be provided (at 670).

Lastly, the eventual purpose of the generation of the forecast is to modify user or organization behaviors (at 680). In some embodiments, modifying behaviors may be dependent upon the user to formulate and implement. In advanced embodiments, suggested behaviors based upon the forecast analysis (such as commodity hedging, investment trends, or securing longer or shorter term contracts) may be automatically suggested to the user for implementation. In these embodiments, the system utilizes rules regarding the user, or organization, related to objectives or business goals. These rules/objectives are cross referenced against the forecasted values, and advanced machine learning algorithms may be employed in order to generate the resulting behavior modification suggestions. In some other embodiments, the user may configure state machines in order to leverage forecasts to generate these behavior modification suggestions. Lastly, in even further advanced embodiments, in addition to the generation of these suggestions, the system may be further capable of acting upon the suggestions autonomously. In some of these embodiments the user may configure a set of rules under which the system is capable of autonomous activity. For example the forecast may be required to have above a specific accuracy threshold, and the action may be limited to a specific dollar amount for example.

III. EXAMPLES

Now that the systems and methods for forecasting using time series datasets have been described in considerable detail, attention will be turned to a series of example screenshots of the systems and methods being employed. It should be noted however, that these example screenshots are but a limited set of embodiments presented for clarification purposes. As such, these example screenshots should not limit the scope of the presently disclosed invention in any way.

Figure 7:
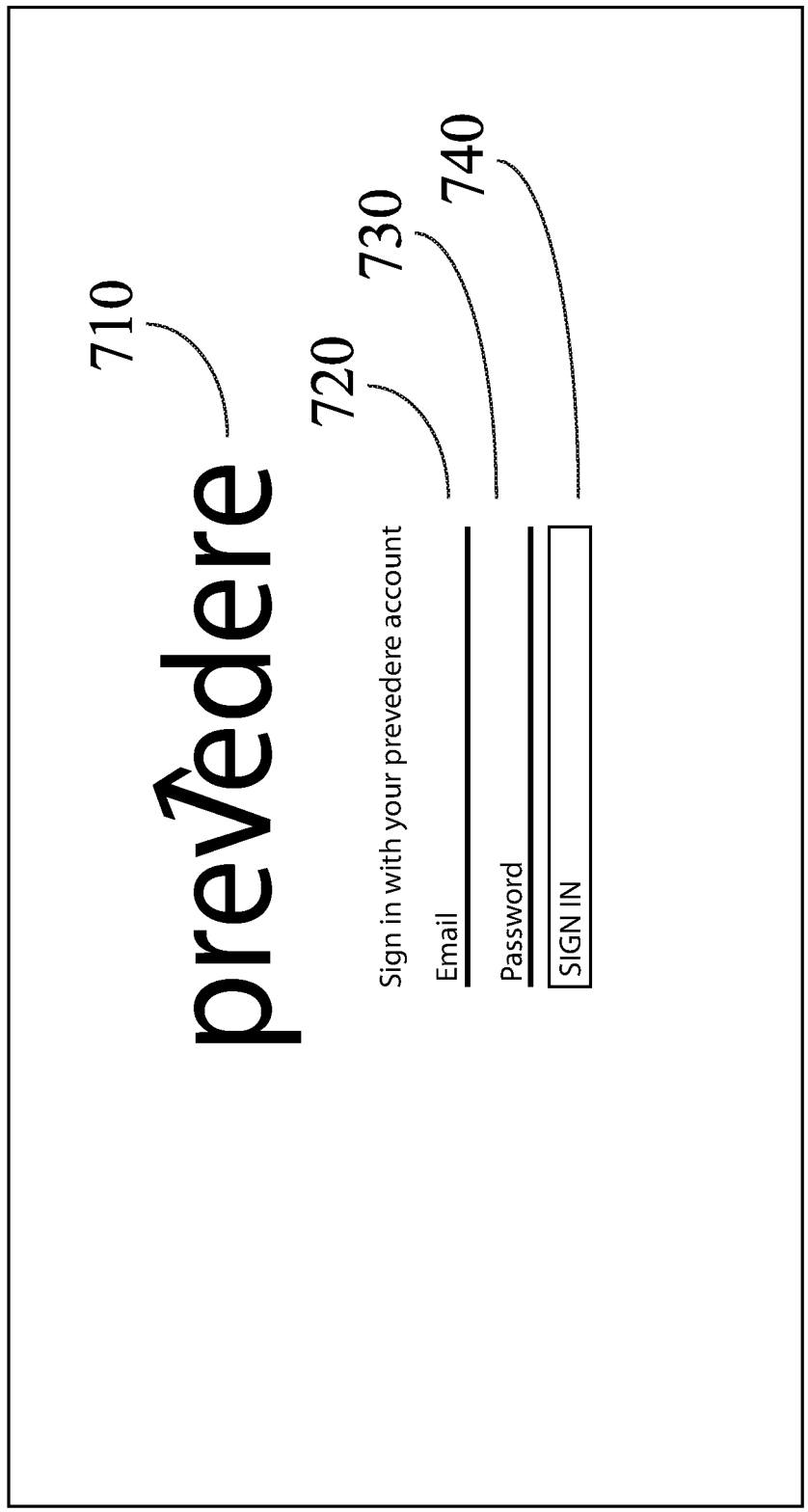
FIGS. 7-15B are example screenshots illustrating the forecasting using time series datasets, in accordance with some embodiments.
Figure 8A:
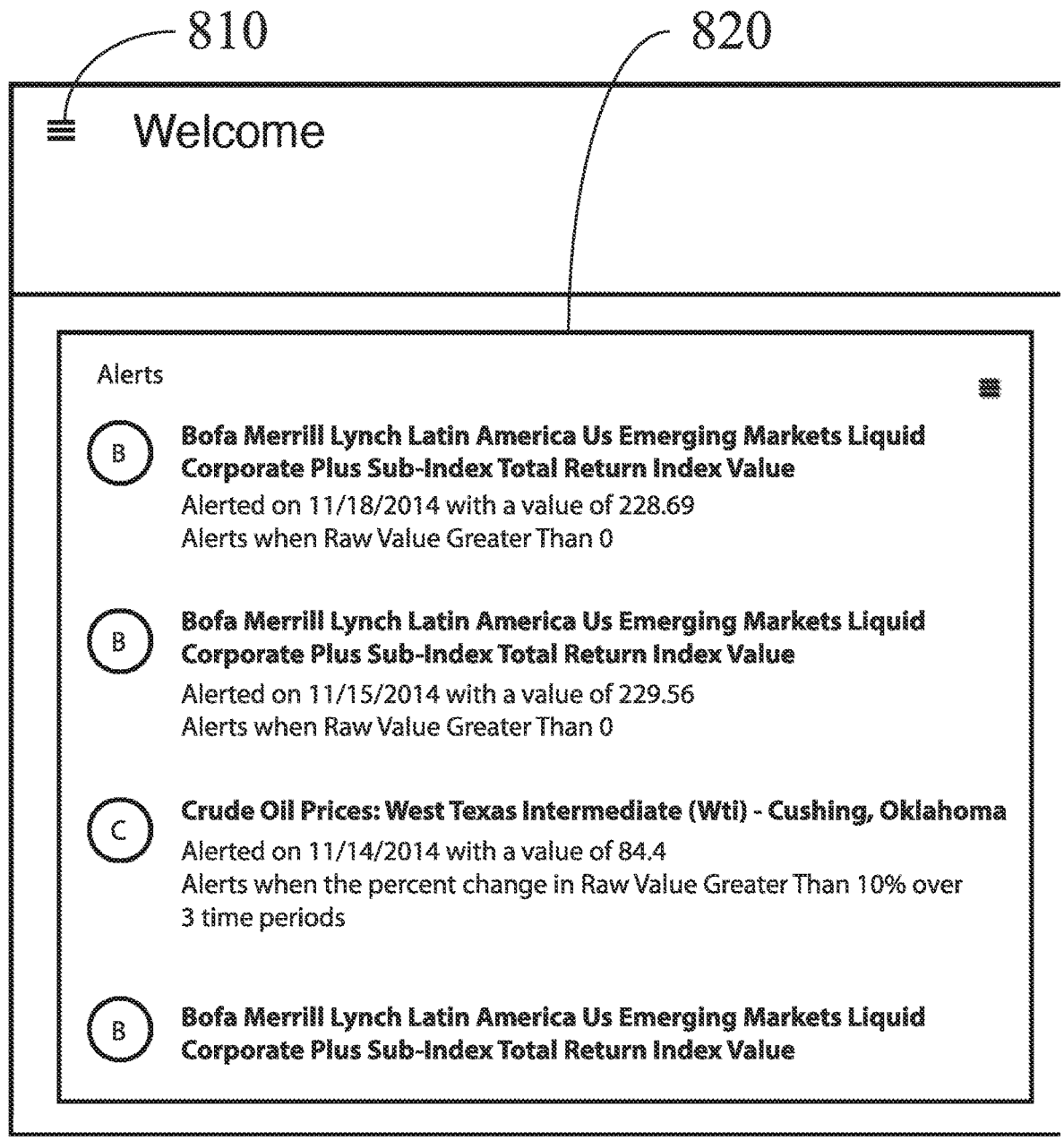
Figure 8C:
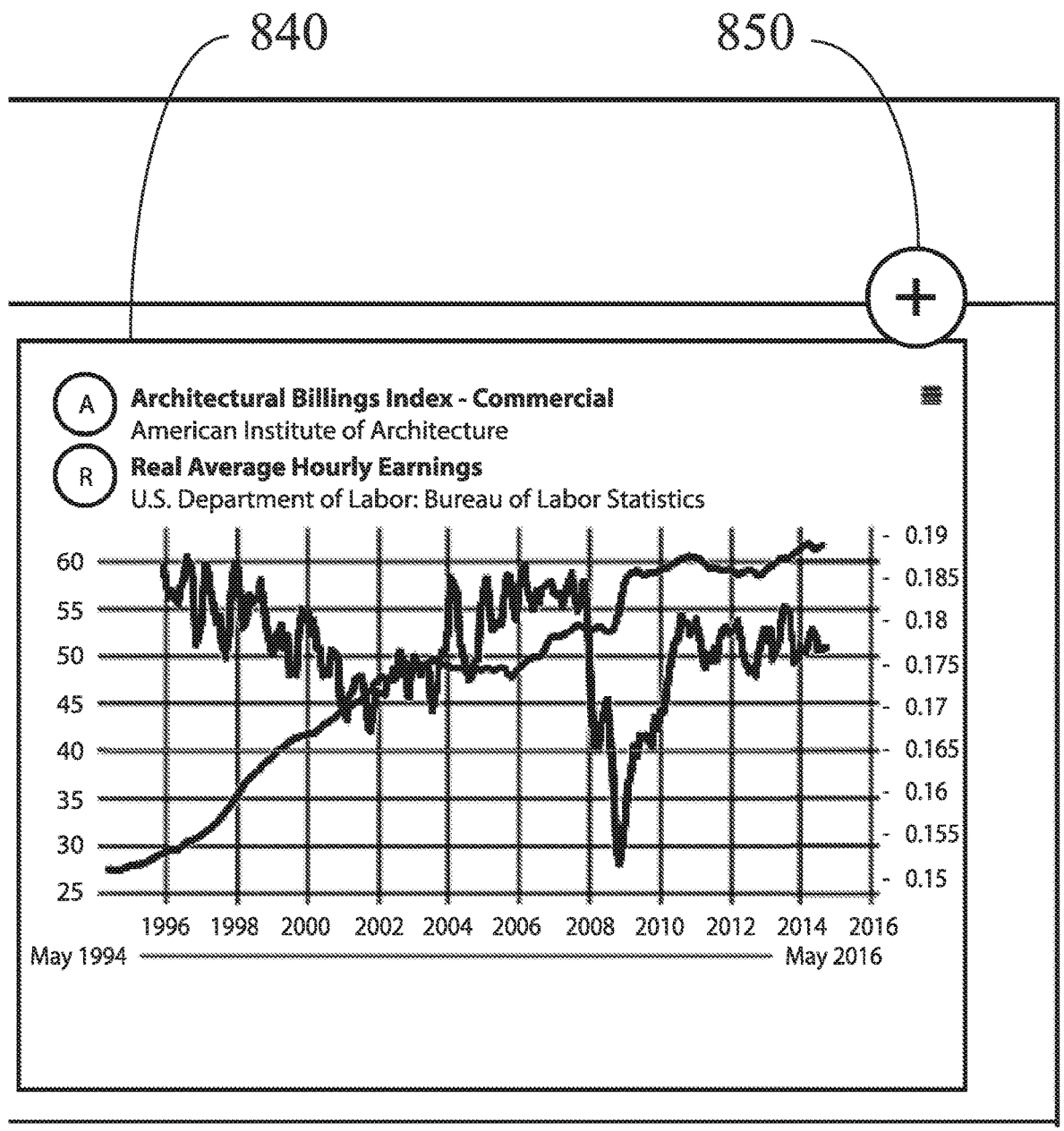
Figure 8D:
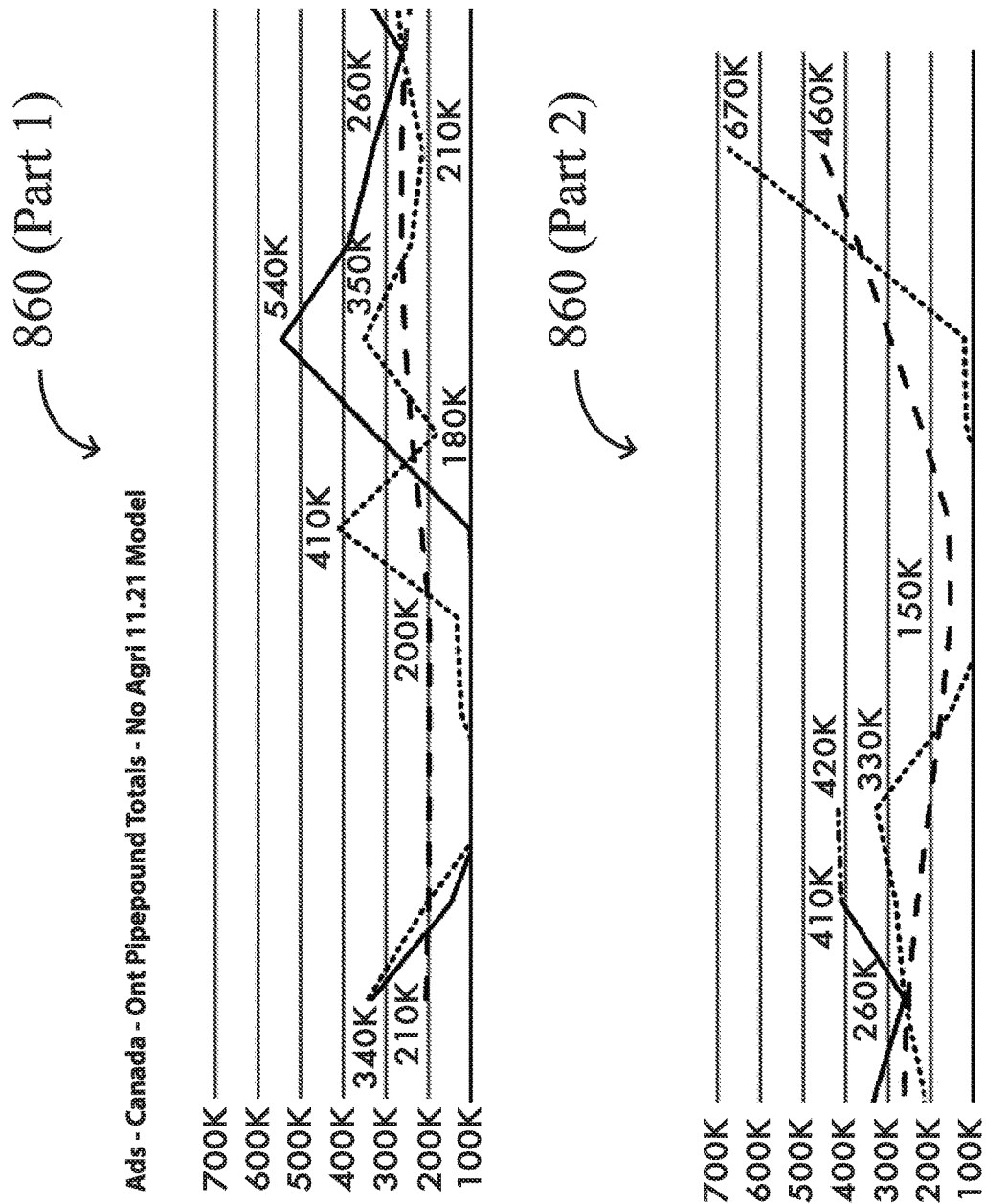

FIG. 7 provides an initial login screenshot. The user, organization, or provider of the system may have a branded logo 710 presented on this screen. Fields exist for the user to input their username (here an email address) 720, and password 730. After inputting the required information the user may select to sign into their account via the sign in button 740. In some embodiments, it may also be possible to link their account to social media logins, such as Twitter®, Facebook®, LinkedIn® or the like.

After a user logs in, they may be presented with a home screen as seen in reference with FIGS. 8A-8D. This screen may include feeds for alerts 820, news 830, and recent or frequently utilized indicator feeds 840. The content displayed in any of these feeds may be configured by the user, in some embodiments. The home screen may further include a dropdown "hamburger" menu 810, or similar menu selection, for navigating the forecasting system. Recent forecasts 860 may also be presented for easy access and reference. Additional field may further be added to the home page, via the addition button 850, to provide a truly customized and user friendly interface.

Figure 9A:
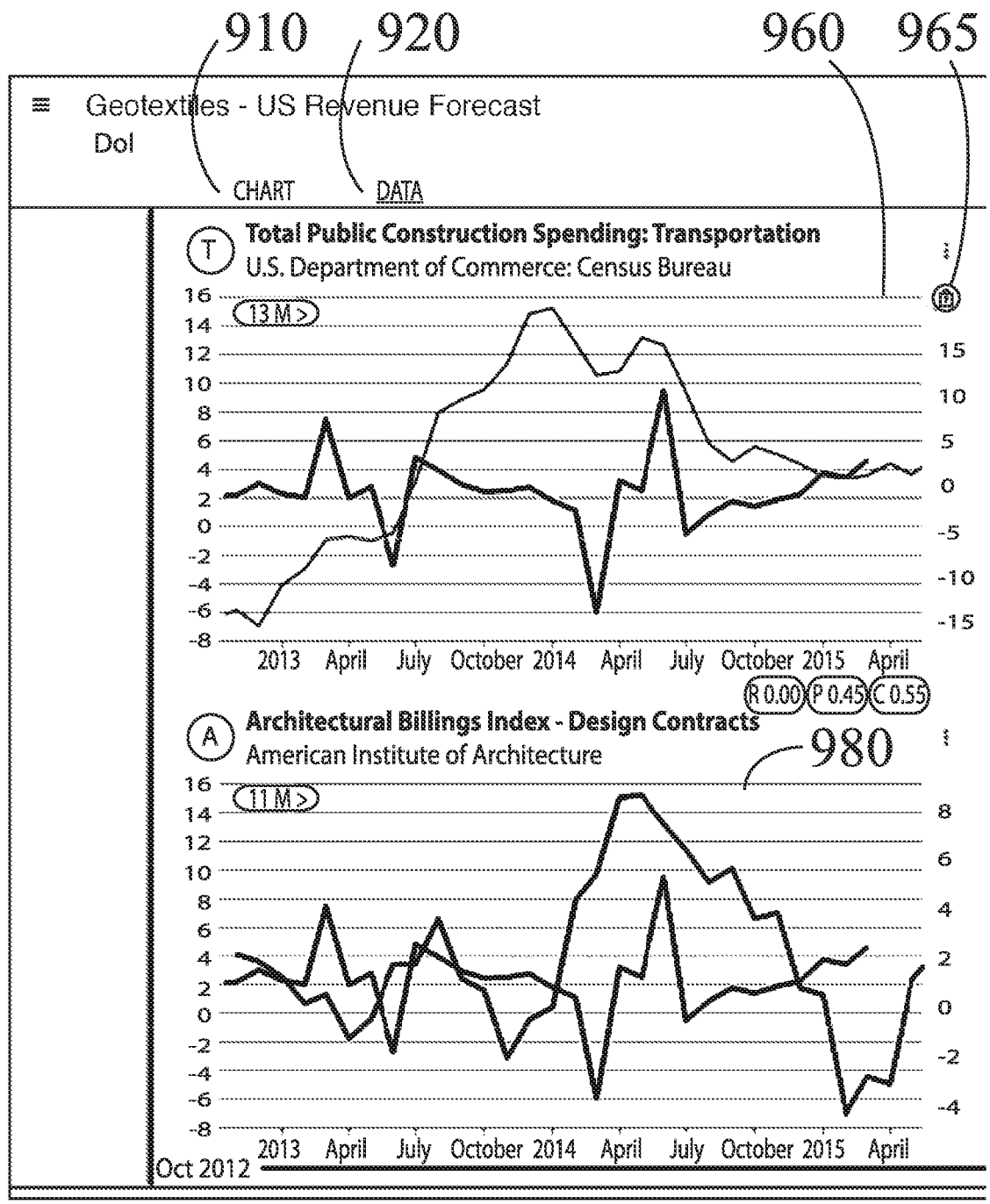
Figure 9B:
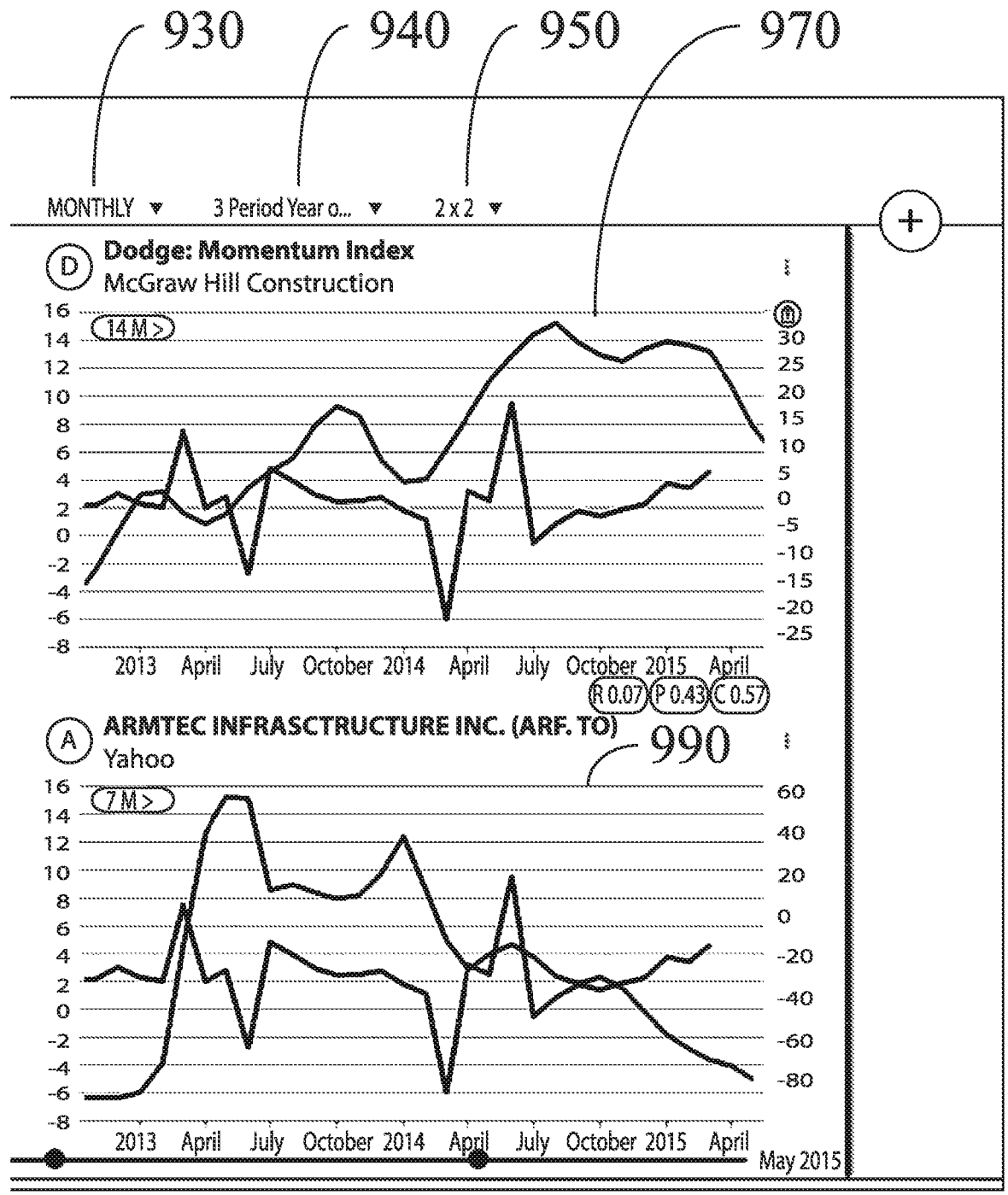

In FIGS. 9A & 9B, the user has navigated to a recent forecast by either selecting it from the homepage at 860, or via the menu 810. In this example, the user has two tabs to select from. The first is graphs 910 of the indicator and forecast data, and the second is for raw numbers 920. In this example figure the graphs 910 has been selected. The frequency 930 for the forecast may be selected from a drop down menu, as well as the type of calculations 940 being displayed, and how the graph data is being displayed 950.

In this example forecast four indicators and their associated graphs are being illustrated: total public construction spend 960, dodge momentum index 970, architectural billings index 980, and the stock price for a construction company 990. On each of these graphs the forecast (darker line) is provided with an overlay of the index movement (lighter line). Two of these indicators have been time domain locked, as seen by the icon 965. At the bottom of the page the time domain is illustrated as a timeline with an initial time and end time clearly marked. As noted above, the user may drag either of these 'dots' in order to alter the period considered for the indicators (outside of those indicators that have been locked).

Figure 10A:
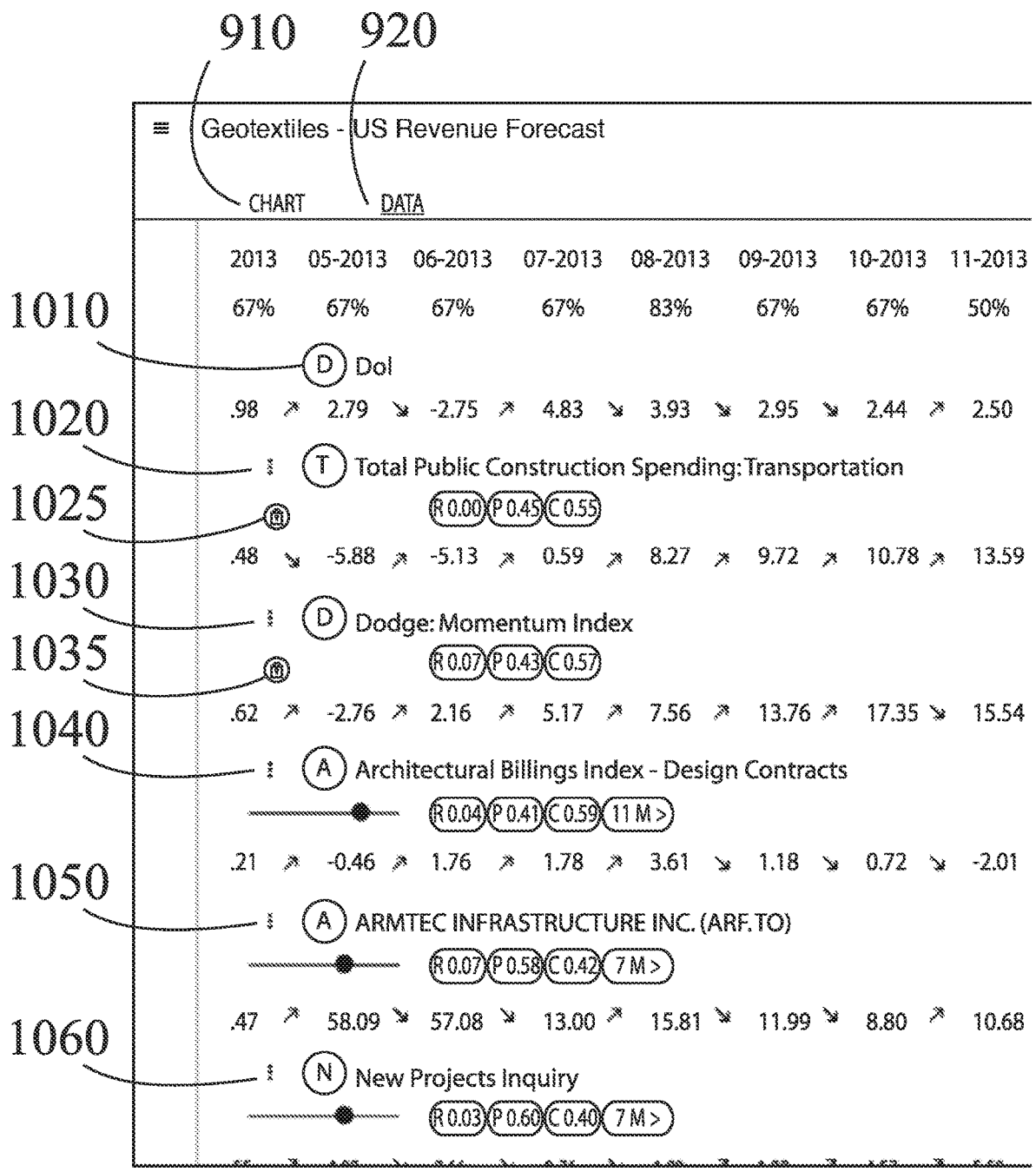
Figure 10B:
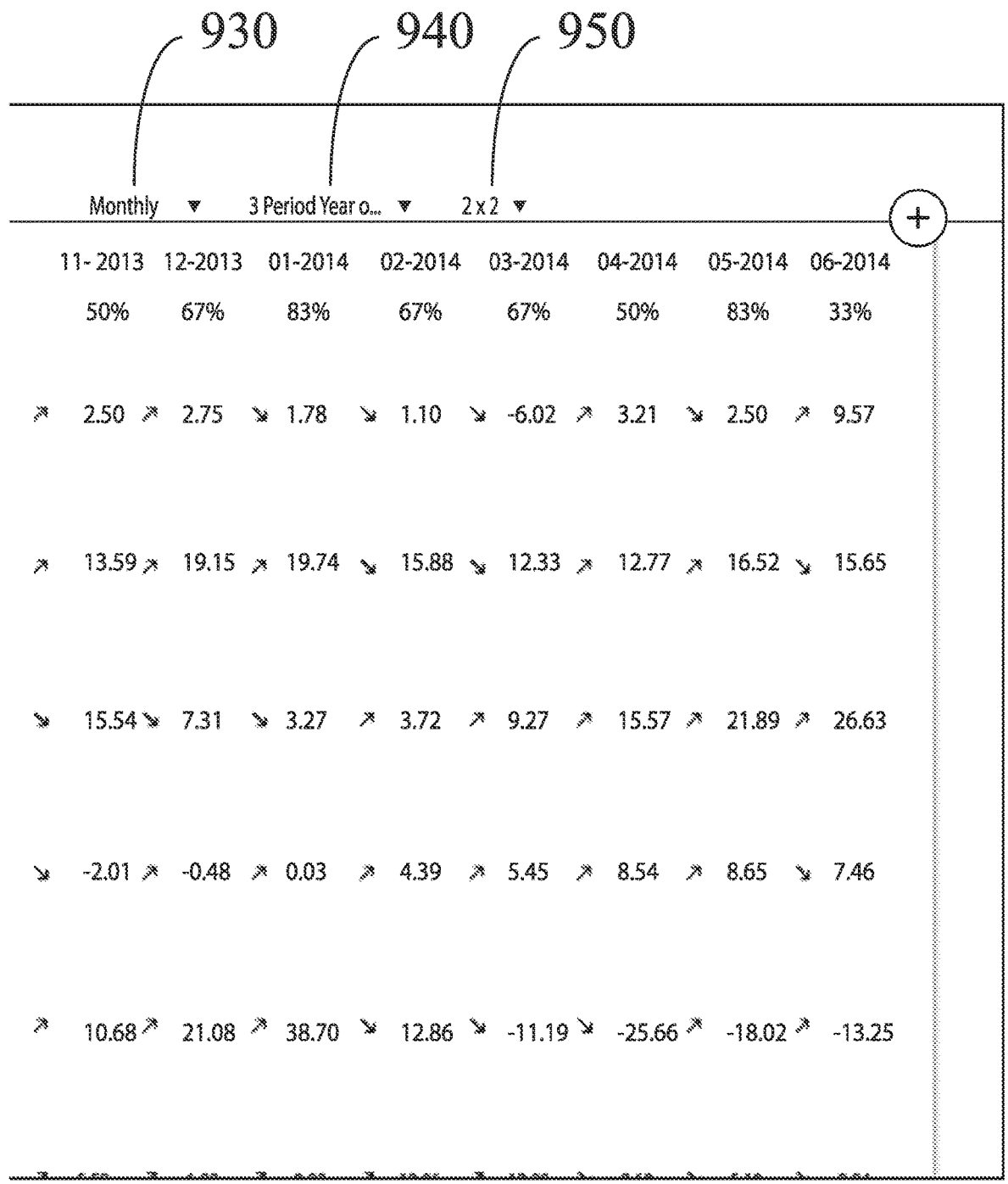

Alternatively, the user may wish to visualize the data in chart format rather than as graphs. FIGS. 10A & 10B provide such an example illustration where the data tab 920 has been selected by the user. Again, the top options regarding frequency 930 for the forecast, type of calculations 940 being displayed, and how the data is being displayed 950, as well as the graph tab 910 and data tab 920 are illustrated. However, in this view, rather than showing graphs, raw data values of time periods may be illustrated. The dollar value 1010 for this specific forecast is illustrated on top. Percentages of the period are provided, as well as direction of any shift in value and actual values are likewise illustrated.

Beneath the forecasted metric 1010, each of the indicators contributing to the forecast is provided. As previously noted these include total public construction spend 1020, dodge momentum index 1030, architectural billings index 1040, the stock price for a construction company 1050, and new project inquiries 1060. Due to screen real-estate more indicator values are able to be displayed at one time in this view as compared to the graphical view. The first two indicators are seen to be time domain locked, as indicated by the lock icon 1025 and 1035. All indicators include metrics including $R^2$ value, procyclic value and countercyclic value as compare to the forecast. Non-time locked indicators also show their offset amount, and a time domain selector that may be modified by the user.

Figure 11A:
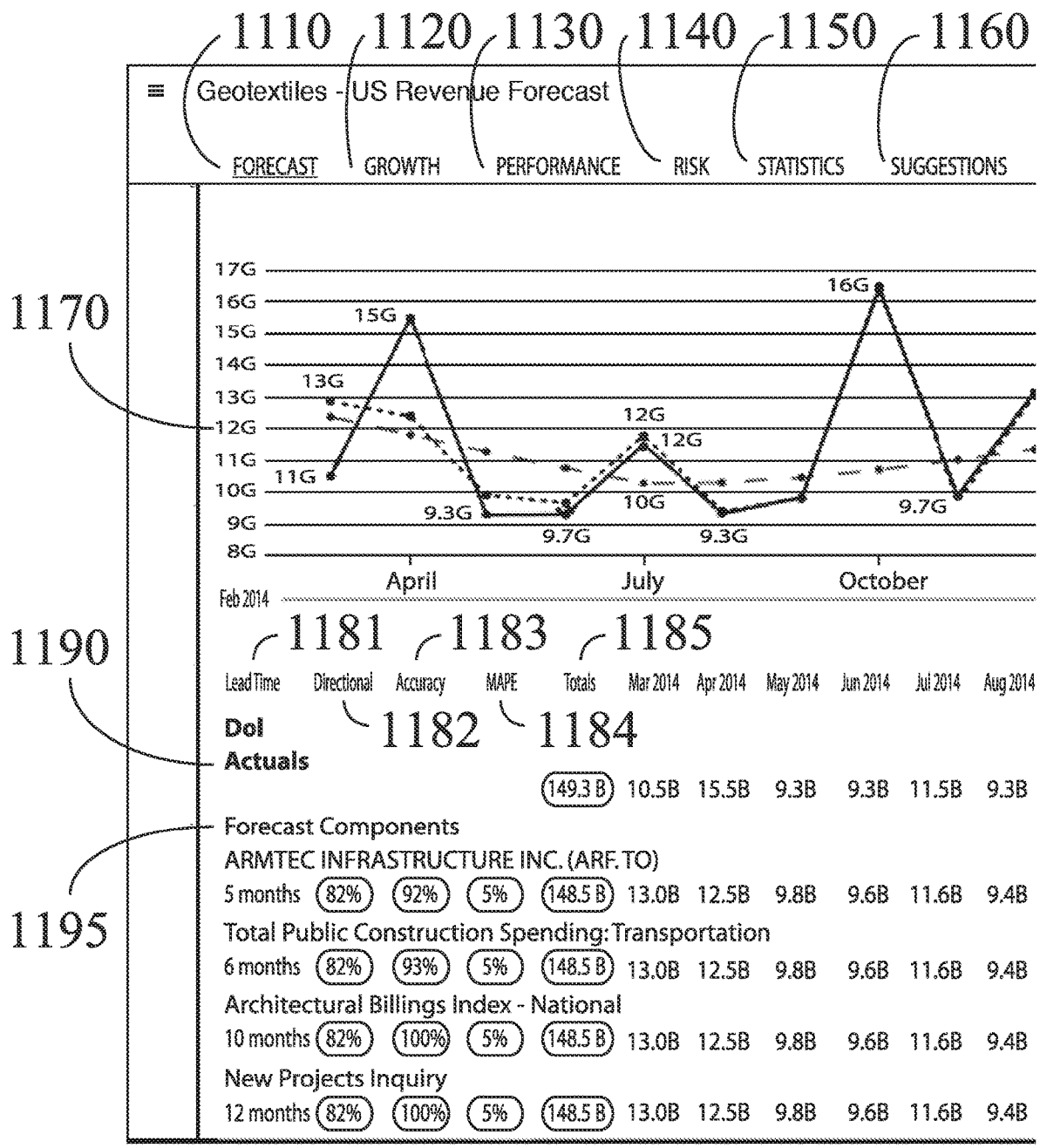
Figure 11B:
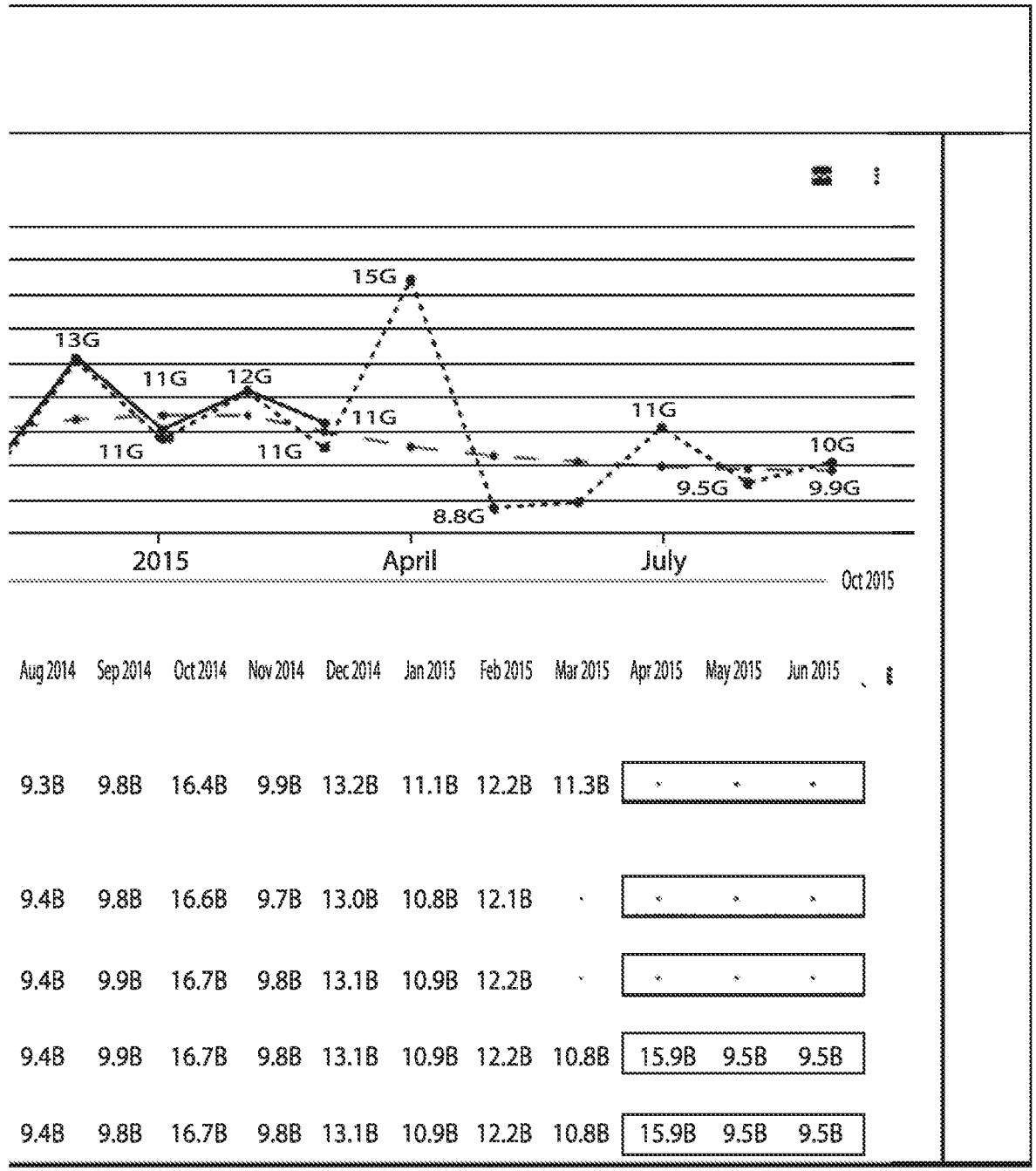

Moving on, FIGS. 11A & 11B provide a forecast graphical screen for the indicators previously discussed. In this example screenshot, a number of tabs are selectable by the user. These include the forecast 1110, which is currently being illustrated, growth analytics 1120, performance measures 1130, risk analysis 1140, statistics of the forecast 1150, and suggestions 1160.

On this forecast tab 1110 screen, the forecast graph 1170 is prominently illustrated. This includes actuals (solid line), the forecast (closely spaced dashes) and a trend line (widely spaced dashes). Note that in this example the forecast and actuals are in close agreement for much of the period displayed. Below the forecast graph 1170 is raw data regarding the actuals 1190, and the indicators 1195 used to compile the forecast. These values are each presented over a set of time periods. Each indicator has metrics illustrated, including lead time 1181, directionality 1182, accuracy 1183, mean absolute percent error (MAPE) 1184, and total values over the time period 1185.

Figure 12A:
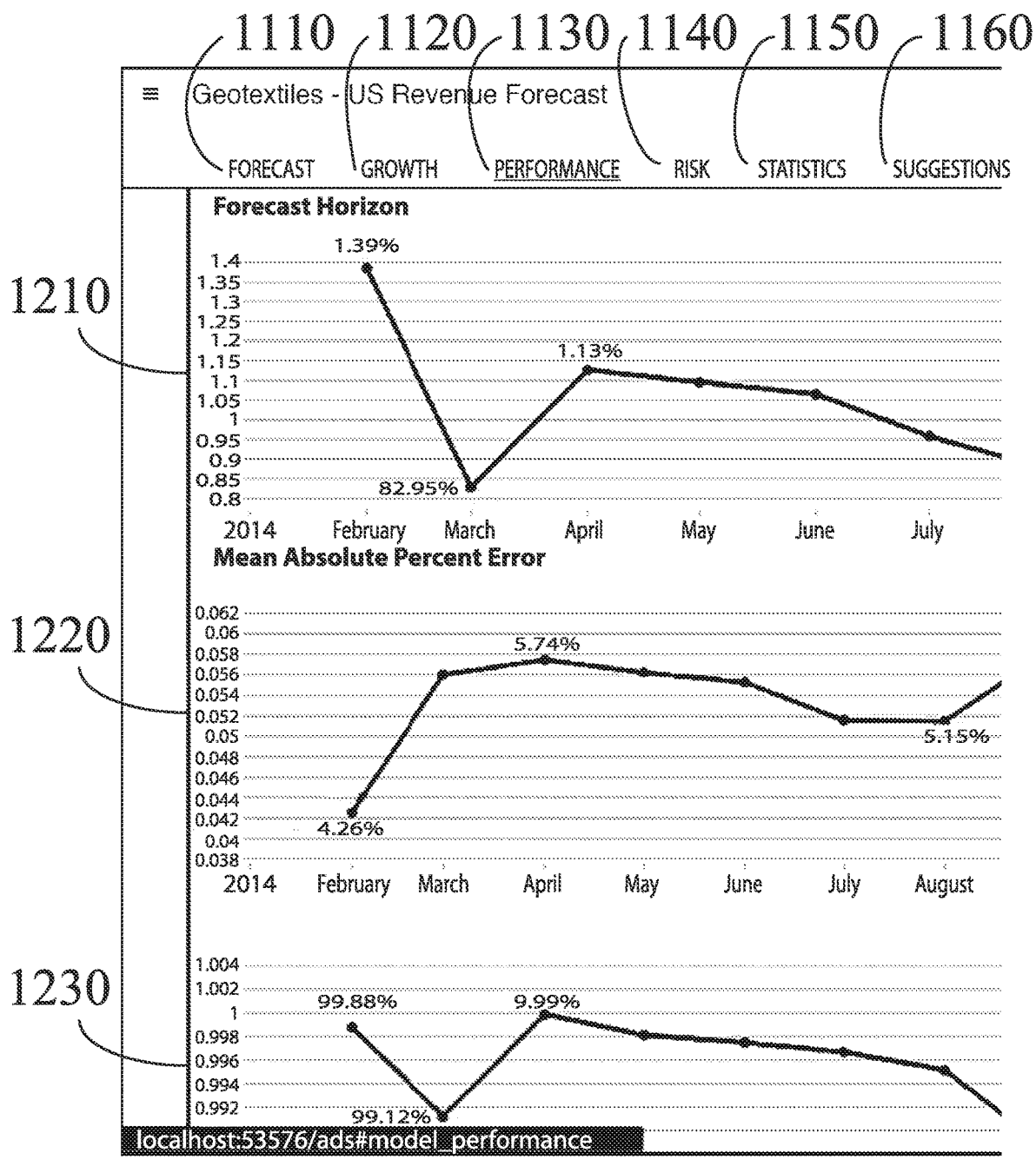
Figure 12B:
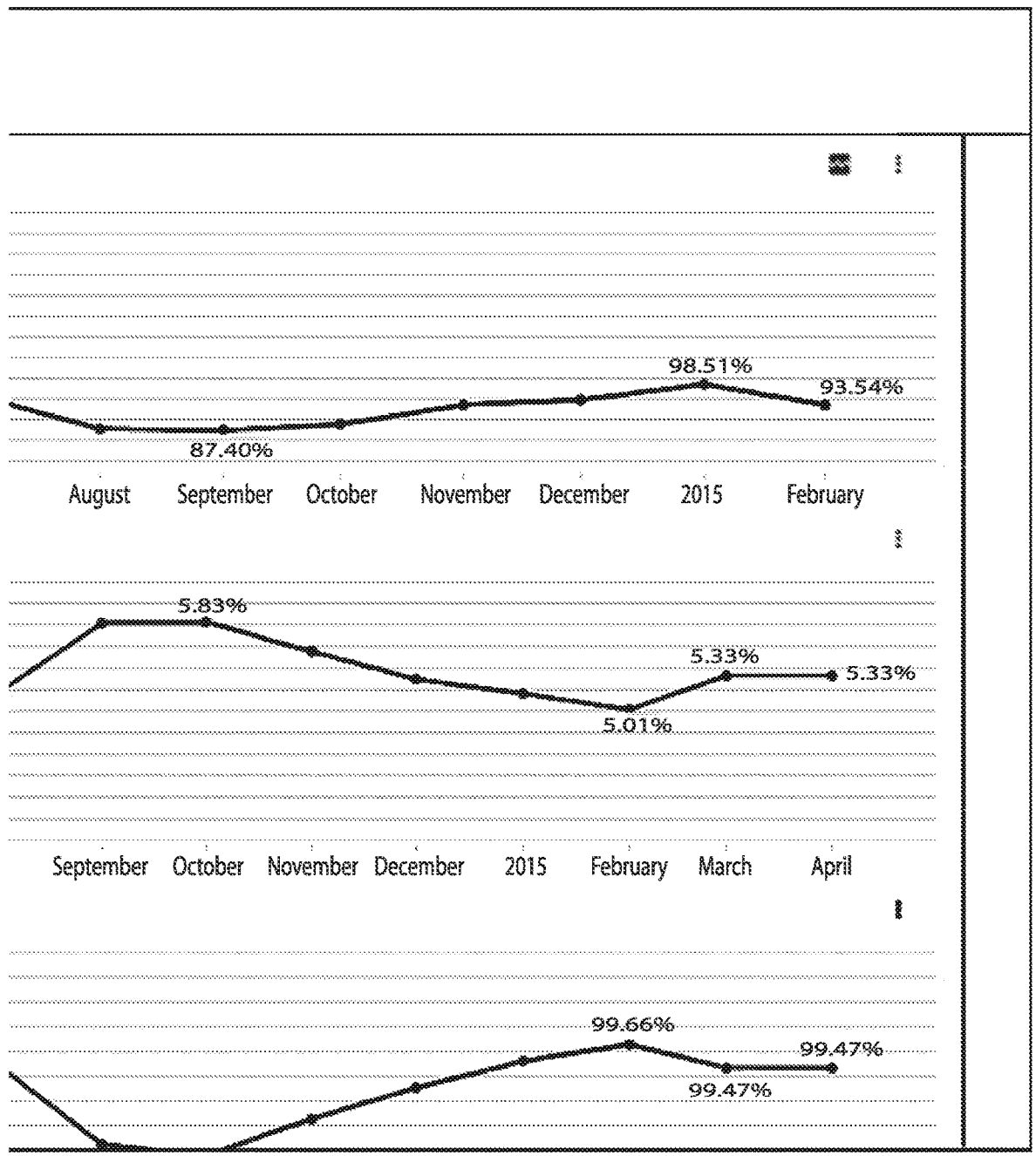

In FIGS. 12A & 12B, the performance tab 1130 is being illustrated for the forecast. Here graphs for the forecast horizon 1210, mean absolute percent error 1220, accuracy 1230, and other statistical measures may be illustrated. This allows a user to determine, at any time period, the fidelity of the forecast.

Figure 13A:
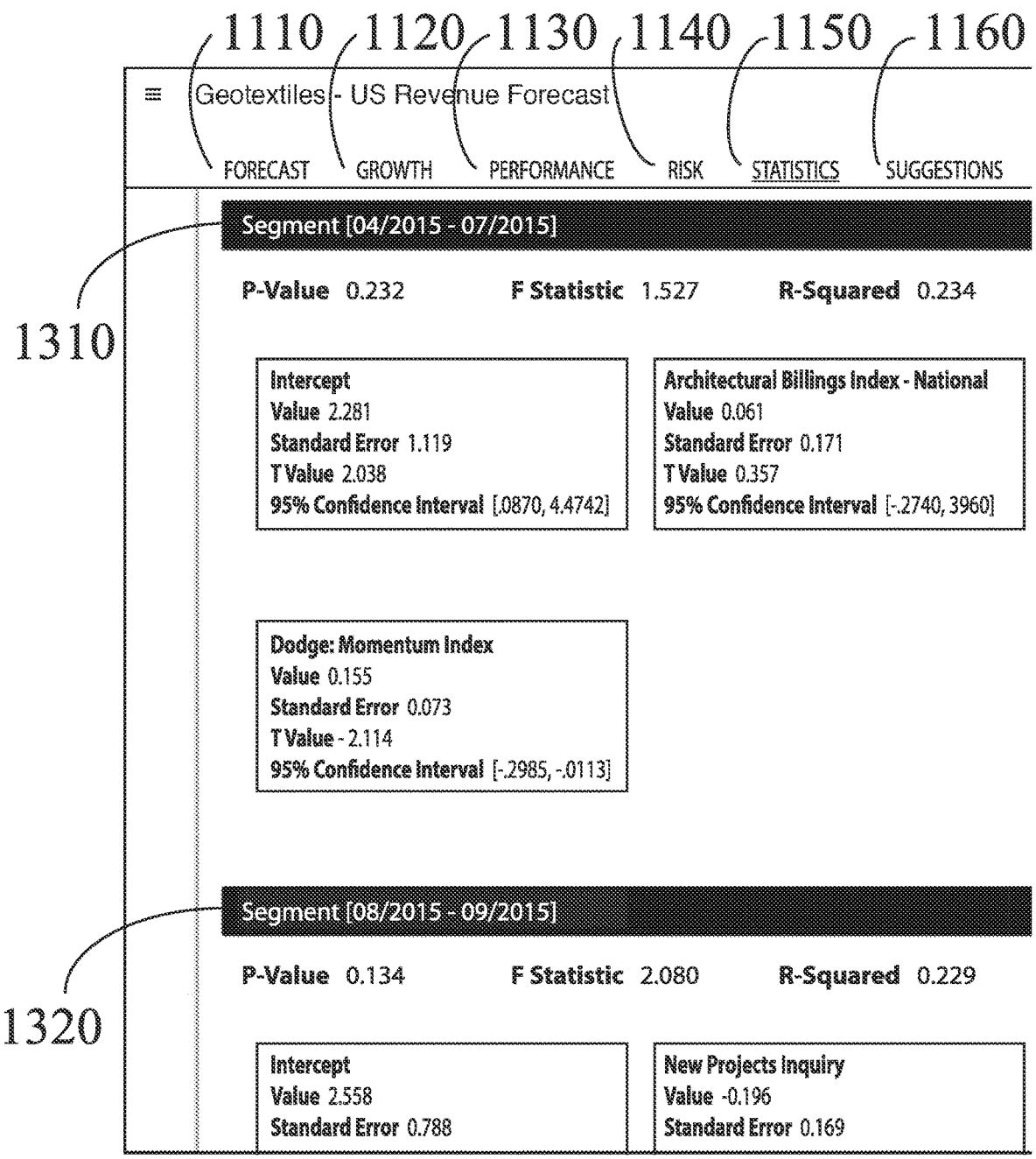

Likewise, in FIGS. 13A & 13B the statistics tab 1150 is being illustrated. This tab allows a user to delve into the details of any time segment of the forecast. Here two segments are shown at 1310 and 1320 respectively; however, a user may scroll down on the page to view the remaining time segments. For each segment a series of statistical measures are provided, including a P value, F statistic, $R^2$, adjusted and predictive $R^2$ values, standard error estimate, and any other desired statistical measure as is well known in the arts of statistical analysis. Also for each segment, the individual indicators are each illustrated along with their actual values, error, standard error, T value and 95% confidence interval. This allows the user to delve deeply into the factors influencing any given time segment, and truly understand the risks and validity of the forecast for these time periods.

Figure 14:
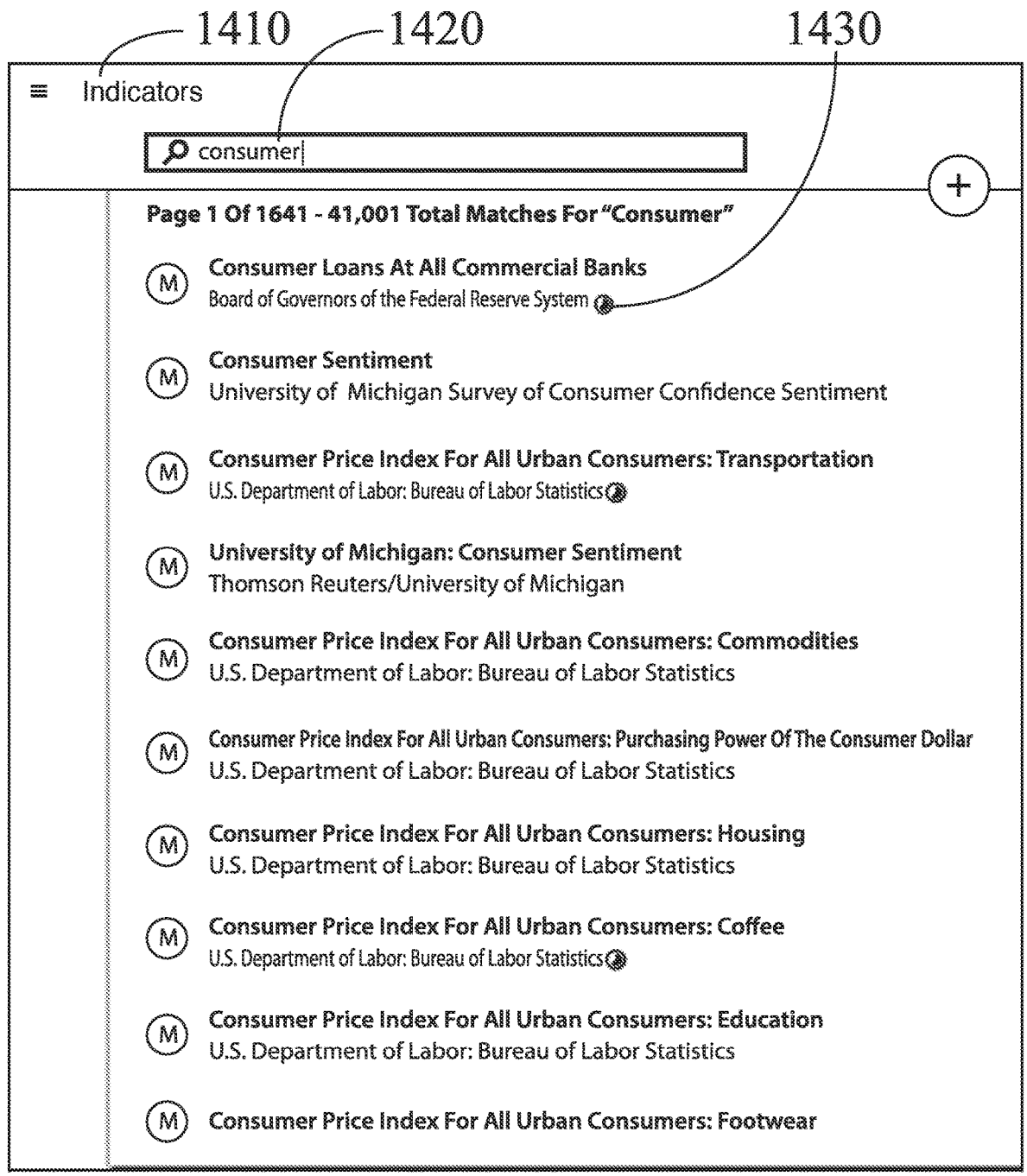

At FIG. 14 an example screenshot is provided for the searching of indicators 1410 for inclusion into a forecast. In this example, a text field 1420 is provided which allows the user to search for any term. The results are provided in a list format along with the sources. Datasets that include seasonal adjustments may include an icon 1430 that readily indicates this to the user. As previously mentioned, the search results may be presented to the user in a number of ways. For example, common or respected indicators may be displayed before more obscure or less reliable indicators. Further indicators that are more commonly predictive for a forecast may be provided before less predictive indicators. Of course, as previously discussed, there are a wide variety of means to display and order search results.

Figure 15A:
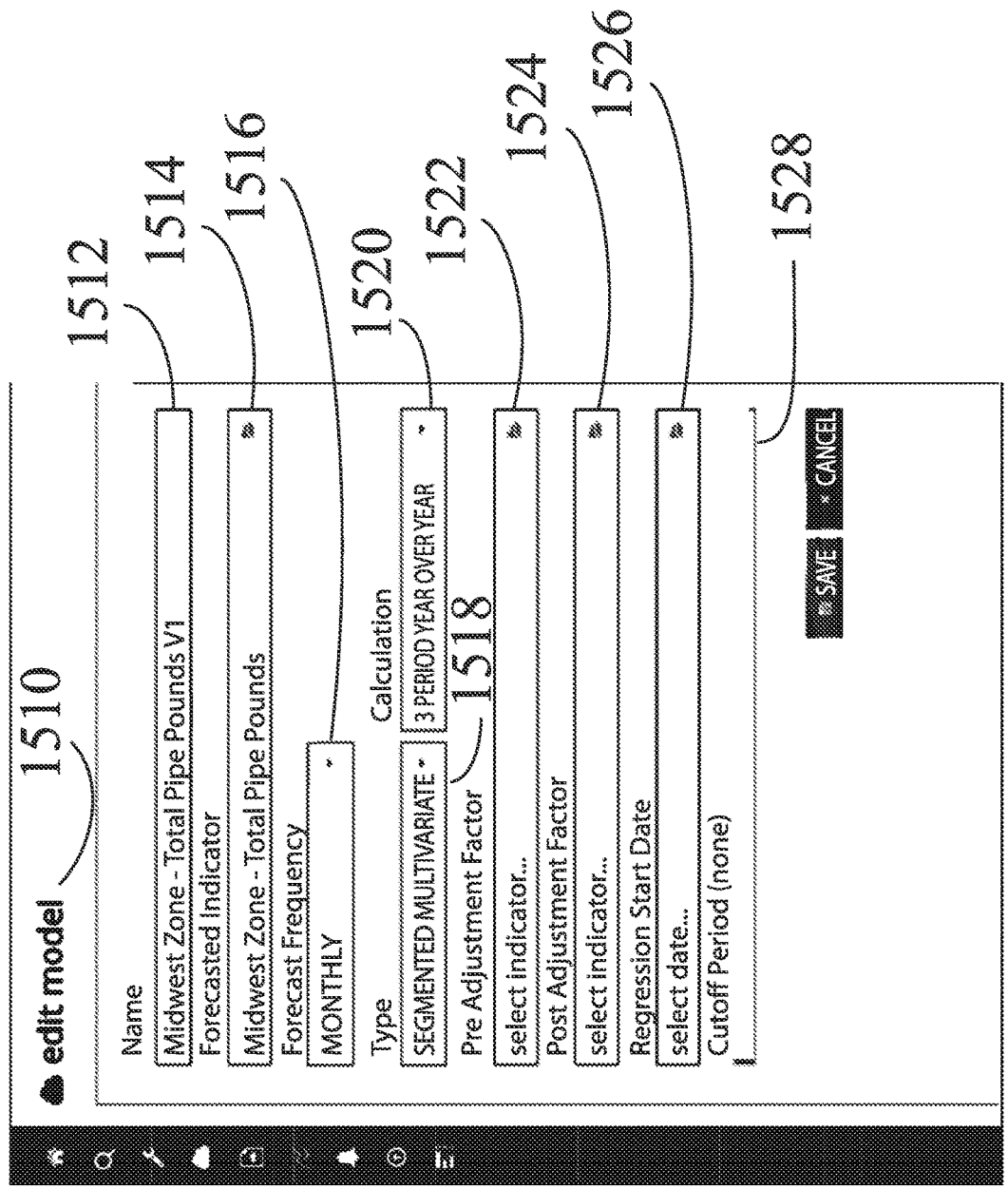
Figure 15B:
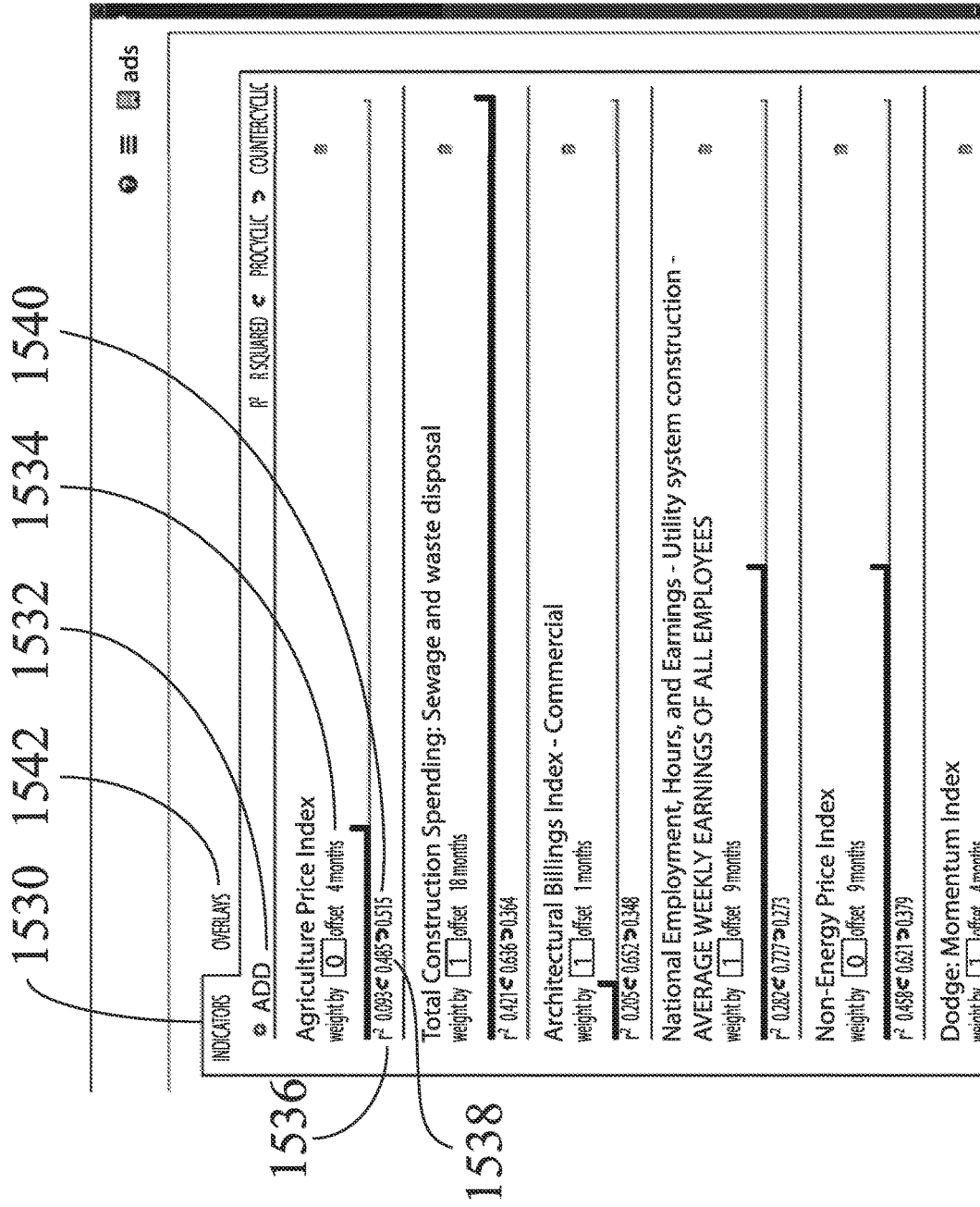

After the user selects indicators, they may be utilized in a forecast builder, as seen in relation to FIGS. 15A & 15B to edit a forecast model 1510. The user is able to name the model in field 1512. The file for the indicator being forecasted for may be selected at field 1514. The frequency of the forecast may be selected from a drop down menu 1516. The forecast type may likewise be selected from a drop down menu 1518, and calculation used from drop down menu 1520.

A pre-adjustment factor may be applied by selecting the appropriate indicator from field 1522. Likewise, a post-adjustment factor may be applied by selecting the appropriate indicator from field 1524. The start date for the regression is selected from a field 1526, as well as a cutoff period using a slider bar 1528. The user is able to save or cancel the forecast model at any time.

The user also have the ability in the forecast builder to model indicators via the indicator tab 1530, or define overlays vie the overlay tab 1542. In the indicator tab 1530 the user is able to add additional indicators using the add button 1532. Below is a listing of the various indicators, along with the option for the user to input a weight in the weight field 1534, and define an offset using the slider bar. For any given weight and offset the indicator provides an $R^2$ value 1536, procyclic value 1538, and countercyclic value 1540. As previously discussed, the weight and offset for an indicator may be altered on the fly, and the resulting statistical measures may be likewise updated such that the use is able to fully appreciate the impact the indicator has upon the forecast, and is best able to decide the most advantageous parameters for a given indicator. As previously mentioned, in some embodiments the system is enabled to provide suggestions for the best weights and offsets in order to optimize the $R^2$ value 1536, procyclic value 1538, and countercyclic value 1540 for the indicator.

IV. SYSTEM EMBODIMENTS

Figure 16A:
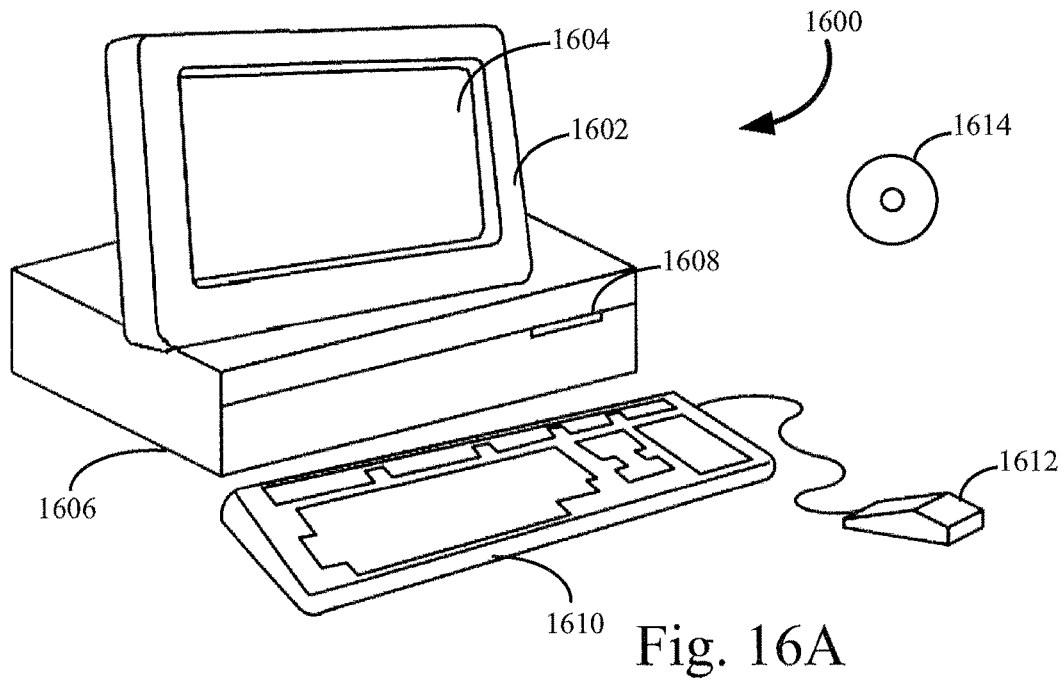
FIGS. 16A and 16B illustrate exemplary computer systems capable of implementing embodiments of the data management and forecasting system.
Figure 16B:
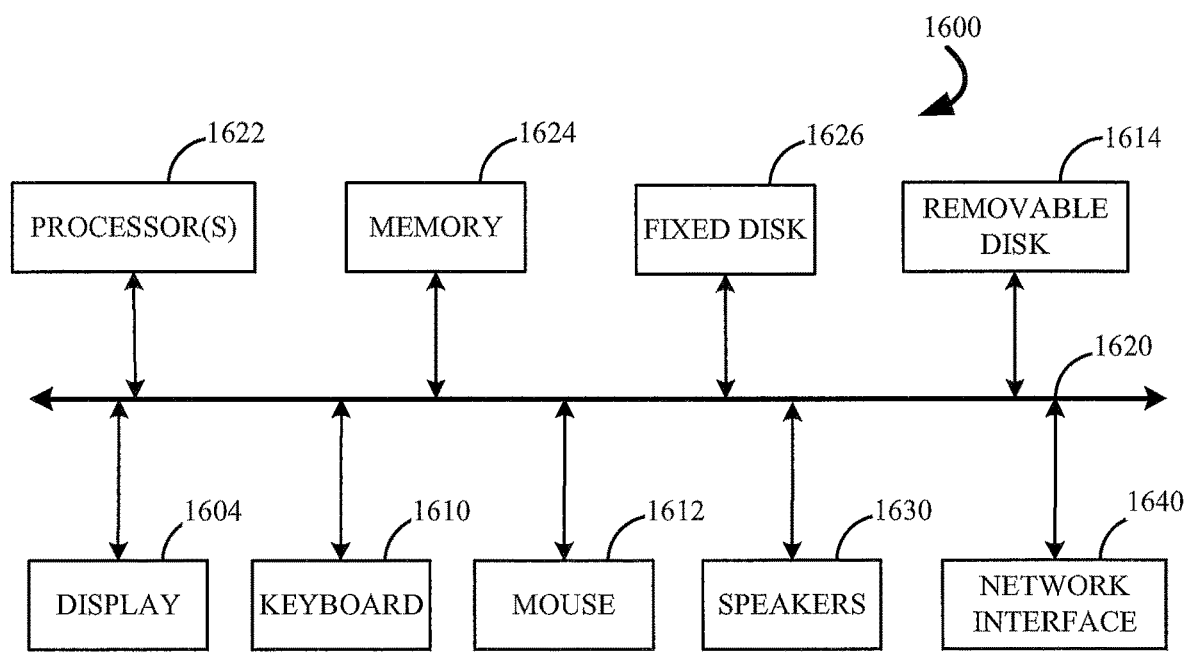

Now that the systems and methods for the forecasting using time series data have been described, attention shall now be focused upon systems capable of executing the above functions. To facilitate this discussion, FIGS. 16A and 16B illustrate a Computer System 1600, which is suitable for implementing embodiments of the present invention. FIG. 16A shows one possible physical form of the Computer System 1600. Of course, the Computer System 1600 may have many physical forms ranging from a printed circuit board, an integrated circuit, and a small handheld device up to a huge super computer. Computer system 1600 may include a Monitor 1602, a Display 1604, a Housing 1606, a Disk Drive 1608, a Keyboard 1610, and a Mouse 1612. Disk 1614 is a computer-readable medium used to transfer data to and from Computer System 1600.

FIG. 16B is an example of a block diagram for Computer System 1600. Attached to System Bus 1620 are a wide variety of subsystems. Processor(s) 1622 (also referred to as central processing units, or CPUs) are coupled to storage devices, including Memory 1624. Memory 1624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 1626 may also be coupled bi-directionally to the Processor 1622; it provides additional data storage capacity and may also include any of the computer-readable media described below. Fixed Disk 1626 may be used to store programs, data, and the like and is typically a secondary storage medium (such as a hard disk) that is slower than primary storage. It will be appreciated that the information retained within Fixed Disk 1626 may, in appropriate cases, be incorporated in standard fashion as virtual memory in Memory 1624. Removable Disk 1614 may take the form of any of the computer-readable media described below.

Processor 1622 is also coupled to a variety of input/output devices, such as Display 1604, Keyboard 1610, Mouse 1612 and Speakers 1630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1622 optionally may be coupled to another computer or telecommunications network using Network Interface 1640. With such a Network Interface 1640, it is contemplated that the Processor 1622 might receive information from the network, or might output information to the network in the course of performing the above-described big data analysis for consumer sentiment. Furthermore, method embodiments of the present invention may execute solely upon Processor 1622 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 1600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for generating a composite index, useful in association with a forecasting engine, the method comprising:
   receiving selected datasets at a data aggregation server;
   checking the selected datasets for relativity, wherein relativity is the degree of accuracy reduction of a dataset when converted for forecasting;
   substituting at least one dataset above a relativity threshold when a substitute dataset is available;
   rejecting at least one dataset above the relativity threshold when no substitute dataset is available;
   normalizing the selected datasets;
   receive formula configurations;
   calculate composite by applying formula configurations to the normalized datasets by an application server of the forecasting engine; and
   updating the calculated composite in real time as changes are made to the selected datasets.

2. The method of claim 1 wherein the selected dataset includes internal data and external data.

3. The method of claim 2 wherein the external data includes at least one of demographics data, meteorological data, climatic data, weather conditions, environmental data, industrial data and international financial market conditions.

4. The method of claim 1 wherein normalizing includes shifting a time domain for at least one of the selected datasets such that all of the normalized datasets have a common time domain.

5. The method of claim 1 wherein normalizing includes converting the selected datasets into a percentage value.

6. The method of claim 1 wherein normalizing includes converting the selected datasets into a dollar value.

7. The method of claim 1 wherein normalizing includes converting the selected datasets into a dollar versus time value.

8. A composite builder for generating a composite index, useful in association with a, the system comprising:
   an aggregation server for receiving selected datasets; and
   a logical engine for checking the selected datasets for relativity, wherein relativity is the degree of accuracy reduction of a dataset when converted for forecasting, substituting at least one dataset above a relativity threshold when a substitute dataset is available, rejecting at least one dataset above the relativity threshold when no substitute dataset is available, normalizing the selected datasets, receive formula configurations, calculate composite by applying formula configurations to the normalized datasets, and update the calculated composite in real time as changes are made to the selected datasets.

9. The system of claim 8 wherein the selected dataset includes internal data and external data.

10. The system of claim 9 wherein the external data includes at least one of demographics data, meteorological data, climatic data, weather conditions, environmental data, industrial data and international financial market conditions.

11. The system of claim 1 wherein normalizing includes shifting a time domain for at least one of the selected datasets such that all of the normalized datasets have a common time domain.

12. The system of claim 8 wherein normalizing includes converting the selected datasets into a percentage value.

13. The system of claim 8 wherein normalizing includes converting the selected datasets into a dollar value.

14. The system of claim 8 wherein normalizing includes converting the selected datasets into a dollar versus time value.

\* \* \* \* \*